(12) United States Patent
Osborne et al.

(10) Patent No.: US 10,917,447 B2
(45) Date of Patent: *Feb. 9, 2021

(54) INTELLIGENT AND NEAR REAL-TIME MONITORING IN A STREAMING ENVIRONMENT

(71) Applicant: CERNER INNOVATION, INC., Kansas City, KS (US)

(72) Inventors: Elizabeth Fay Osborne, Kansas City, MO (US); Scott Gordon Siebers, Leawood, TX (US); Chad G. Hays, Overland Park, KS (US); Jason Andrew Komarek, Kearney, MO (US); Todd Bechtel, Overland Park, TX (US)

(73) Assignee: CERNER INNOVATION, INC., Kansas City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/525,901

(22) Filed: Jul. 30, 2019

(65) Prior Publication Data
US 2019/0356712 A1 Nov. 21, 2019

Related U.S. Application Data

(63) Continuation of application No. 15/389,578, filed on Dec. 23, 2016, now Pat. No. 10,462,199.

(51) Int. Cl.
*H04L 29/06* (2006.01)
*G06N 20/00* (2019.01)
(Continued)

(52) U.S. Cl.
CPC ......... *H04L 65/4069* (2013.01); *G06N 5/046* (2013.01); *G06N 7/005* (2013.01); *G06N 20/00* (2019.01); *H04L 65/1083* (2013.01)

(58) Field of Classification Search
CPC . H04L 65/4069; H04L 65/1083; G06N 7/005; G06N 5/046; G06N 20/00
See application file for complete search history.

(56) References Cited

U.S. PATENT DOCUMENTS

2009/0265288 A1* 10/2009 Chakravarty .......... G06N 5/022
706/11
2009/0287628 A1* 11/2009 Indeck .............. G06F 16/24568
706/47
(Continued)

OTHER PUBLICATIONS

Final Office Action received for U.S. Appl. No. 15/389,532, dated Nov. 25, 2019, 38 pages.
(Continued)

*Primary Examiner* — Abdullahi E Salad
(74) *Attorney, Agent, or Firm* — Shook, Hardy & Bacon L.L.P.

(57) ABSTRACT

The present invention is directed to intelligent and near real-time monitoring in a streaming environment. In embodiments, a streaming platform streams raw data from raw data capture devices, where the raw data is contextually enriched using multiple information sources. A rule execution operator, integrated within the streaming platform, detects events by executing rules against the contextually enriched data. The rules applied are customizable, flexible, multivariate, and dynamically responsive to changing information. When an event is detected, an action can be instantiated in response to the event detection and/or newly derived information. The action and/or instructions for performing the action are communicated to external sources, where the action can be initiated and/or completed. Accordingly, actions are instantiated in near real time relative to the initial receipt of raw data from which the events were detected. Actions may be delayed using sophisticated temporal reasoning, in some embodiments.

18 Claims, 10 Drawing Sheets

(51) Int. Cl.
  *G06N 7/00* (2006.01)
  *G06N 5/04* (2006.01)

(56) References Cited

U.S. PATENT DOCUMENTS

| | | | |
|---|---|---|---|
| 2010/0223557 A1* | 9/2010 | Kenney | G06Q 10/10 |
| | | | 715/736 |
| 2013/0151458 A1* | 6/2013 | Indeck | G06N 5/025 |
| | | | 706/47 |
| 2013/0218672 A1 | 8/2013 | Jennings et al. | |
| 2014/0040454 A1 | 2/2014 | Ramsey et al. | |
| 2015/0058272 A1* | 2/2015 | Tonouchi | G06F 11/3476 |
| | | | 706/47 |
| 2015/0121252 A1 | 4/2015 | Yerli | |
| 2015/0355957 A1* | 12/2015 | Steiner | G06F 11/079 |
| | | | 714/37 |
| 2016/0217381 A1* | 7/2016 | Bloomquist | G06N 5/046 |
| 2016/0294621 A1* | 10/2016 | Werth | G06F 9/453 |
| 2016/0371489 A1* | 12/2016 | Puri | H04L 63/1425 |
| 2016/0373476 A1* | 12/2016 | Del'Anno | G06F 21/554 |
| 2017/0103327 A1 | 4/2017 | Penilla et al. | |
| 2017/0132383 A1* | 5/2017 | Myers | G06F 3/0482 |
| 2017/0344404 A1* | 11/2017 | Liongosari | G06F 9/542 |
| 2018/0181870 A1 | 6/2018 | Osborne et al. | |
| 2018/0183843 A1 | 6/2018 | Osborne et al. | |

OTHER PUBLICATIONS

Final Office Action received for U.S. Appl. No. 15/389,578, dated Mar. 28, 2019, 15 pages.
First Action Interview received for U.S. Appl. No. 15/389,578, dated Oct. 31, 2018, 5 pages.
First Action Interview received for U.S. Appl. No. 15/389,532, dated Jul. 31, 2019, 7 pages.
Notice of Allowance received for U.S. Appl. No. 15/389,578, dated May 31, 2019, 08 pages.
Notice of Allowance received for U.S. Appl. No. 15/389,578, dated Aug. 21, 2019, 5 pages.
Preinterview First Office Action received for U.S. Appl. No. 15/389,532, dated Jun. 28, 2019, 5 pages.
Preinterview First Office Action received for U.S. Appl. No. 15/389,578, dated Jun. 28, 2018, 6 pages.

* cited by examiner

INTELLIGENT AND NEAR REAL-TIME MONITORING IN A STREAMING ENVIRONMENT

CROSS-REFERENCE TO RELATED APPLICATIONS

This application is a continuation of U.S. Pat. No. 10,462,199, filed on 23 Dec. 2016, entitled "Intelligent and Near Real-Time Monitoring in a Streaming Environment," and issuing on 29 Oct. 2019, which is related by subject matter to U.S. Pat. No. 10,643,137, filed on 23 Dec. 2016 entitled "Integrating Flexible Rule Execution Into a Near Real-Time Streaming Environment," and issuing on 5 May 2020, the entireties of all of which are incorporated by reference herein.

BACKGROUND

With the advent of streaming data in near real time, the ability to capture and collect vast quantities of raw data of analysis was born. Initially, the streamed data is raw and unprocessed, without use or application until, for example, it is normalized and/or modified into a compatible format for subsequent applications and/or various apparatus. Because the streamed data, on its own, does not provide any knowledge or information besides its own content, the streamed data may be processed, organized, and structured for subsequent applications or analysis. The amount of streamed data quickly exhausts computational resources, such as processor availability and memory. For example, hundreds to thousands of data points per second may be received from a single raw data source. The streamed data must further be transferred to subsequent applications at remote devices or separate systems via wired or wireless connections, for example. The process of transferring streamed data elsewhere also ties up limited resources, such as processors or available bandwidth, and introduces opportunities for data loss.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

In embodiments, the streaming platform retrieves and/or receives incoming raw data from a plurality of varied data sources, in near real time. The streaming platform enriches the raw data using transformational machine-learning techniques to add, infer, learn, create, and manage contextual and relational information for data items and data streams. In this way, the enriched information includes contextual information identified and generated from the raw data items, but which is 'more than the sum' of the whole of raw data as initially received by the streaming platform. The enriched information serves as input to the integrated rule execution operator.

Generally, the integrated rule execution operator executes various rules against the enriched information in order to detect, identify, and instantiate events. The rule execution operator uses a host of customizable rules that are situation specific, exhibit complex temporal reasoning, and are dynamically activated or deactivated based on feedback (e.g., a steady influx of raw data, enriched information, event detections, and actions) in the complex event processing environment. Instantiated events output to the streaming platform, and further to a middleware component, in some embodiments. The instantiated events are used to instantiate actions that are responsive to, or relevant to, an instantiated event. Actions and instructions for performing the actions are communicated to external systems, devices, and/or user applications where the actions are implemented or can be used to implement actions. The integration of the custom rule execution operator within the streaming platform transforms a streaming platform into a fully functional complex event processing system that handles the entire process from collection of the incoming low complexity data to the implementation of actions and/or firing of instantiated events. Generally, events and actions are instantiated in near real time relative to the initial receipt of raw data from which the events were detected.

BRIEF DESCRIPTION OF THE DRAWINGS

Examples are described in detail below with reference to the attached drawing figures, wherein.

DETAILED DESCRIPTION

Figure 1:
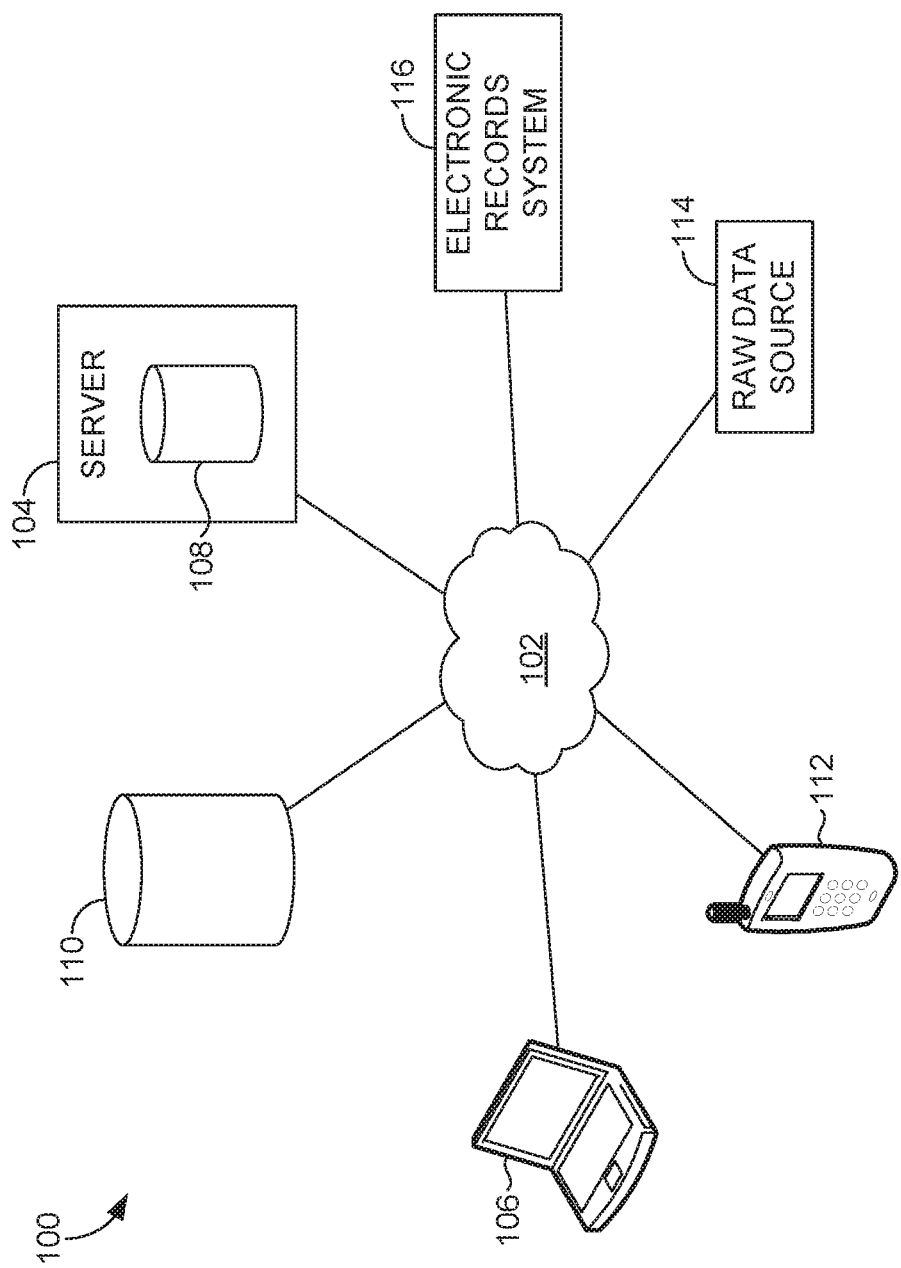
FIG. 1 depicts an exemplary complex event processing system, in accordance with an embodiment of the present invention.

At a high level, the present invention is directed toward the customized integration of a rule execution operator into a real or near real-time streaming platform to create a complex event processing system that intelligently fuses large volumes of incoming low complexity data for a plurality of sources and detects events by evaluating the fused high complexity data. Based on event detection, the complex event processing system can trigger actions, events, and alerts. Moreover, by integrating the rule execution operator into a streaming platform, actions that are responsive to events can be instantiated and implemented in near real time relative to the initial receipt of raw data from which an event is detected.

Generally, streaming platforms collect and enrich vast amounts of information in the form of data. The collected and enriched information is supplied to external applications, devices, and systems for post-processing and use by applications, devices, and systems having functionalities not possessed by the streaming platform. Generally, a streaming platform uses significant system resources to receive or retrieve data, receive incoming raw data, process or normalize raw data, and generate enriched information (e.g., additional and relevant context data from data source(s) is fused with the raw data). Processing the raw data for enrichment and the enrichment processing itself recruits available processors and generates a heavy computational processing load. Further, the large quantities of raw data received and the enriched information generated also exhaust available physical memory for storage purposes. However, in some instances, a streaming platform is unable to use the enriched information itself. In such instances, streaming platforms transmit or communicate the enriched information elsewhere for additional processing, use, or implementation as the streaming platforms lack capabilities or functionalities. Thus, in addition to processor and memory resource limitations described above, communicating or transmitting the large amount of enriched information to external entities would be time-consuming and further tie up limited resources (e.g., processors, non-persistent memory, network bandwidth, etc.) in streaming platforms. The transmission of the enriched information to external systems and applications also introduces latency and delays beyond the near real-time or real-time functioning of the streaming platform, and data loss during transmission and/or user interface crossings.

The invention herein addresses problems and limitations of previous streaming platforms described above. The invention includes methods, computer-readable media, and systems providing a complex event processing engine, such as a rule execution operator, that is custom-built and integrated or embedded within a streaming platform. An integrated or embedded rule execution operator executes a host of rules against the enriched information, in real time, and produces output (e.g., events) that can be immediately used by external systems and applications. The streaming platform having an integrated or embedded rule execution operator, described herein, may directly implement actions or fire events, removing the need to transmit or communicate enriched information to external entities for additional processing. As such, the steaming platform having the integrated or embedded rule execution operator is faster, increases resource efficiency, and reduces latency. As will become apparent from this Detailed Description, integrating a custom-built rule execution operator into a streaming platform provides a technological improvement that solves problems created by the use of prior streaming platforms and found in the operations of prior streaming platforms. Moreover, the flexible and customizable nature of the integrated rule execution operator introduces new functionality to the complex event processing environment by adding sophisticated temporal reasoning abilities, situation-specific intelligence, and dynamic rules that are responsive, in near real time, to changing information and states (e.g., activation and deactivation of rules, layered conditional reasoning, etc.).

The integrated or embedded rule execution operator is a technological improvement that creates a new function within the streaming platform and that alleviates problems associated with streaming platforms. The integration or 'internal placement' of the rule execution operator has the effect of reducing and/or obviating several of the limited resource burdens described above, regarding computational processing loads, physical memory limitations, and other technological problems created by electronically transmitting a bulk of enriched information to an external application, device, and/or system. The methods, computer-readable media, and systems provided herein introduce a new functionality that improves the performance of a streaming platform, reduces computational processing loads, reduces data loss by obviating transmissions for external analysis, and decreases latency and/or delays between the collection of data and implements of actions by applications, devices, and/or systems. The streaming platform having an integrated or embedded rule execution operator, described herein, may directly implement actions or fire events, removing the need to transmit or communicate enriched information to external entities for additional processing. Moreover, by integrating the rule execution operator into the streaming platform, the embodiment of the invention reduces the occurrence of technological errors that arise from data traversing multiple interfaces, such that the output from the rule execution operator and streaming platform exhibits increased accuracy. As such, the integration of the rule execution operator is such that the rules can process enriched information obtained from distinct external sources, various operating interfaces, and other systems. Further still, the ability to instantiate actions for a detected event, and communicate action instructions to multiple different sources in near real time, relative to receipt of the triggering raw data, is a technological improvement because additional latencies are not introduced to the complex processing environment. The rule execution operator, users, and external devices are able to respond immediately and modify performance, functions, and tasks in near real time.

Continuing, this Detailed Description describes, among other things, methods, systems, and computer-readable media for building and integrating a flexible event processing engine within a real-time or near real-time data streaming platform. Generally, a large volume of low complexity data, such as raw data, is streamed into a streaming platform. The streaming platform may obtain the raw data from multiple diverse sources that may otherwise lack interoperability and/or which use incompatible operating interfaces. The streaming platform performs complex processing on the incoming raw data and generates new enriched information in real or near real time. The incoming raw data is used to retrieve relevant information from other data sources, is matched or aligned with said relevant information, and is fused with the relevant data to produce new enriched information that provides more information than the initial raw data. The resultant new enriched information provides contextual information and inference information not provided or present in the initial raw data. The streaming platform uses a robust and aggressive caching (e.g., tangible cache memory storage) mechanism to fuse the incoming raw data into contextually enriched information.

In embodiments, the streaming platform feeds the enriched information, in real or near real time, into a customized event processing engine that is integrated or embedded into the streaming platform itself. An exemplary event processing engine includes a rule execution operator, in some embodiments. The integrated or embedded rule execution operator evaluates the enriched information in view of rules for event detection and instantiation, event blocking (e.g., do not instantiate a detected event, stop an instantiated event, delay an instantiated event, wait to instantiate an event until a second event is detected and instantiate the events concurrently or in a specified sequence), and/or new or additional rule application and instantiation (e.g., when an event is detected and/or instantiated, a new or additional rule becomes applicable and is instantiated against the same or subsequent enriched information). The integrated or embedded rule execution operator is flexible in that rules are dynamically (e.g., as enriched information is received) adjusted based on inferences and information determined using the enriched information. The integrated or embedded rule execution operator is flexible in that rules include temporal reasoning that is dynamically responsive to the inferences and information identified or gleaned from the enriched information. The temporal reasoning of the integrated or embedded rule execution operator facilitates detection, identification, and instantiation of complex events. For example, the integrated or embedded rule execution operator may learn that the detection of three different events within a 15-minute time window, beginning with the first event detection, may trigger a new rule and/or another event. In another example, the integrated or embedded rule execution operator may learn that the detection of one particular event is likely to precede a second, different event and the integrated or embedded rule execution operator adjusts rules and the application of rules accordingly. For example, the integrated or embedded rule execution operator may learn or know that after the particular event is detected, there is a defined percentage (e.g., 75%) likelihood that the second event will occur within a given time window (e.g., one hour) of the detected particular event, and the integrated or embedded rule execution operator enables, in response to a detection of the particular event, one or more rules that 'watch' for the second, different event within the enriched information for the defined time frame. In some embodiments, the detection of one event by the integrated or embedded rule execution operator is used to lower a detection threshold and/or event instantiation threshold for one or more rules applicable to the same type of event or a different event. Thus, the integrated or embedded rule execution operator exercises intelligent temporal reasoning and dynamic rule application and enforcement against the enriched real or near real-time data feed from the streaming platform.

As events are instantiated (e.g., output generated) by the integrated or embedded rule execution operator using the enriched information received in real or near real time, the integrated or embedded rule execution operator communicates the events, notifications of the events, or indications of the events back to the streaming platform. The streaming platform directly or indirectly (e.g., communicates with applications, device, and/or systems communicatively coupled to the streaming platform) implements actions or 'fires' the instantiated events. External systems, devices, and applications are "external" to the streaming platform when said systems, devices, and applications are not integrated or embedded into the streaming platform, in contrast to the rule execution operator. However, it will be understood that the external systems, devices, and applications may reside on the same computing device (e.g., server) as the streaming platform, in some embodiments. Exemplary actions triggered by event instantiation include the automatic parameterization of smart alarms, notifications of compliance goals, indications of healthcare events, initiation of streaming raw data from a device, storage of information in an electronic record, communications of targeted instructions or recommendations for human intervention (e.g., clinician), and the like. This list is illustrative in nature and is not to be construed as limiting because implementations of the invention may be undertaken in multiple fields, including non-healthcare environments, and thus are considered to be within the scope of this invention.

One embodiment provides one or more non-transitory computer-readable storage media having computer-executable instructions embodied thereon that, when executed, perform a method for monitoring a data stream. In embodiments, the media comprises one or more processors configured to perform a method. When an event is detected based on execution of at least one rule against enriched streamed data of a streaming runtime, a notification of the event detection is received. Then, a monitoring application determines, in real time, whether to instantiate one or more actions based on the notification and the event detected. In embodiments, one or more actions are instantiated.

In yet another embodiment, a computer-implemented method is provided. The method includes receiving a notification of an event when the event is detected, based on execution of at least one rule against enriched streamed data of a streaming runtime. A monitoring application determines, in real time, whether to instantiate one or more actions based on the notification and the event detected.

A system is provided in another embodiment. The system comprises a middleware component communicatively coupled to a complex processing system. In embodiments, the middleware component is configured to receive raw data in real time from a plurality of medical capture devices. The middleware component communicates the raw data, in real time, to a streaming runtime having a rule execution operator integrated therein. The system further includes one or more processors integrated within the middleware component. The one or more processors are configured to receive, when an event is detected based on execution of at least one rule against enriched streamed data of the streaming runtime, a notification of the event detection. The one or more processors also determine, in real time, whether to instantiate one or more actions based on the notification and the event detected. In some embodiments, the one or more processors instantiate the one or more actions.

As used in this Detailed Description, the terms "real-time" and "near real-time" refer to a time delay that is typically introduced by data processing itself. Real-time and near real-time processes generally lack purposeful or intentionally added latency. As such, the terms real time and near real time, as used throughout this disclosure, capture time delays introduced by manipulation of data, for example, receipt, retrieval, processing, displaying, transmitting, and/or storing data. The terms real time and near real time are used interchangeably for the purposes of this invention.

Raw data generally refers to data that serves as input to the streaming platform. Raw data may have experienced some processing, but for the purposes of this Detailed Description, raw data refers to low complexity data that has been input to the streaming platform but has not yet been enriched by the streaming platform, in embodiments. Generally, raw data is continuously streamed in near real time to the streaming platform from a plurality of sources. As will be understood by those having skill in the pertinent art, continuous streaming may include packetized data sent at intervals based on time intervals or packet size, and the term "continuous" is not meant to be limiting. Exemplary sources of raw data include an application run on a computing device, a computing device remote from the streaming platform, a capture device that obtains data in near real time or real time (e.g., a physiological monitor), a mobile user device, a workflow system, an electronic records storage database, and/or a middleware component that intercepts raw data from a plurality of such sources. In further embodiments, an exemplary source includes a separate streaming platform.

Enriched information refers to raw data that is being processed or that has been processed by the streaming platform. In embodiments, enriched information refers to high complexity data that is created or generated by the processing performed via the streaming platform, but prior to evaluation by the integrated or embedded rule execution operator. Enriched information has been contextually enhanced, meaning that enriched information includes added, inferred, learned, and/or relational information beyond the raw data items themselves, as initially received by the streaming platform. Contextual enhancement refers to the streaming platform's processing of raw data to synthesize new derived data, which may: link raw data items; associate raw data items; build data structures using raw data; group data; categorize data; sequester data; identify a relationship between more than one data item or data stream; retrieve electronic records determined to be specifically relevant to raw data; create and store relationships between retrieved electronic records and/or raw data; create and store relationships between two or more raw data streams as related; add an identifier to raw data that associates the raw data with one or more of an individual, an entity, or a device; retrieve electronic records determined to be specifically relevant to one or more of an individual, an entity, or a device associated with an identifier added to the raw data; create and store relationships between retrieved electronic records, raw data, and/or said identifiers; fusing individual data items; fusing whole data streams; matching raw data items and/or raw data streams; fusing portions of electronic records with raw data items and/or raw data streams; filtering raw data; aggregating raw data with other raw data; and/or consolidating raw data, for example. This list is not exhaustive and is merely illustrative of various contextual enhancements in some embodiments. As such, this list is not intended to be exclusive, and other contextual enrichment techniques not listed herein are contemplated to be within the scope of this disclosure.

The term "rules" refers to operations that may be executed using one or more data items, individually and/or in combination, to generate enriched information (e.g., including new derived data) and/or to detect events. Generally, rules may be applied to raw data and/or enriched information. Rules are evaluated against streamed data, such as enriched information, and the rule can detect and/or instantiate events based on one or more of the following: the information encoded in one or more data items individually or in combination, the presence of one or more data types, the absence of one or more data types, the sequence or order in which one or more data items are received (e.g., may be indicative of a real-time occurrence in the physical world), the concurrent receipt of one or more data items, the receipt or lack of receipt of one or more data items at or within a defined period of time, the receipt or lack of receipt of one or more data items after a lapsed period of time, the source(s) providing one or more data items, the detection of one or more other events previously and/or within a defined period of time, and the like. Rules may identify and detect relationships and correlations between various data items, data types, sources, and/or other previous, current, on-going, or lapsed relationships/correlations.

The rules described herein are intelligent and flexible, as the rules are built with temporal reasoning. Temporal reasoning enables rules to account for how timing of data and events relates to, and affects, relationships and correlations (e.g., create, sustain, destroy, strengthen, weaken, verify, modify importance, urgency level, or define persistence of). In this way, the temporal reasoning enables the rule execution operator, in evaluating data using the intelligent and flexible rules, to identify or 'spot' trends and patterns in the streamed data. Additionally, the temporal reasoning enables the rule execution operator to predict a likelihood and probability that one or more events may occur in the future or be subsequently detected.

At a high level, events refer to target situations or occurrences, defined by an entity utilizing the streaming platform having an integrated or embedded rule execution operator. Events could be identified based on achievement of a goal, identification of a trend or change in state, a meeting or failure to meet a minimum or maximum, and/or reaching a threshold, for example. Events are identified using streamed raw data, and therefore, events generally correspond to that which is represented or captured by the raw data being streamed.

The present invention may be operational in computing system environments or configurations. Examples of computing systems, environments, and/or configurations that may be suitable for use with the present invention include, by way of example only, servers, virtual machines run on computing devices such as servers, personal computers (PCs), server computers, handheld or laptop devices, multiprocessor systems, microprocessor-based systems, set-top boxes, programmable consumer electronics, network PCs, minicomputers, mainframe computers, distributed computing environments that include any of the above-mentioned systems or devices, and the like.

The present invention may also be operational and/or implemented across a distributed cloud-computing system. Cloud-based computing systems include a model of networked enterprise storage where data is stored in virtualized pools of storage. The cloud storage may be public or private, or hosted by a third party, in embodiments. In some embodiments, the cloud is utilized to store and execute computer programs or software (e.g., applications). Generally, computing devices may access the cloud over a network in order to access stored information stored and/or run computer software from the cloud. Accordingly, a cloud-based computing system may be distributed across multiple physical locations, for example.

FIG. 1 depicts an exemplary computing system environment 100 in which embodiments of the present invention may be implemented. It will be understood and appreciated by those of ordinary skill in the art that the exemplary computing system environment 100 is merely an example of one suitable computing environment and is not intended to suggest any limitation as to the scope of use or functionality of the invention. Neither should the exemplary computing system environment 100 be interpreted as having any dependency or requirement relating to any single component or combination of components illustrated therein. It will be appreciated by those having ordinary skill in the art that the connections illustrated in FIG. 1 are exemplary and other means of establishing a communications link between the computers, systems, and entities shown may be utilized. Although the connections are shown in a solid line, it will be understood that the connections may be wired, wireless, and/or use intermediary components not included in FIG. 1 for simplicity.

The exemplary computing system environment 100 may be a distributed computing environment, such that tasks are performed by remote processing devices that are linked through a communications network 102 that includes, for example, wireless and physical (e.g., hardwired) connections. In embodiments, the communications network 102 may be a Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. Such networking environments are commonplace in offices, enterprise-wide computer networks, intranets, and the Internet.

The exemplary computing system environment 100 includes a computing device in the form of a server(s) 104. Although illustrated as a single server in FIG. 1, the server 104 may be a plurality of servers. In embodiments, the server 104 uses logical connections to communicate with remote computer(s) 106 in a distributed computing embodiment of the exemplary computing system environment 100. When utilized in a wireless networking environment, the server 104 may include a modem or other means for establishing communications over the wireless networking environment, such as the Internet. The server 104 may send and receive information to the remote computer 106 via the communications network 102. In embodiments, wherein remote computer 106 is a plurality computing devices in a distributed environment, the remote computer(s) may be located at a variety of locations. In one embodiment, remote computer 106 may be physically located in retail, wholesale, warehouse, or electronic trading settings, such as a franchise retail store location, a kiosk, a bank branch, or a shipping warehouse, for example. In embodiments, remote computer 106 may be physically located in clinical settings, for example, laboratories, hospitals, inpatient settings, clinics, medical vehicles, veterinary environments, ambulatory settings, healthcare billing and financial offices, hospital administration settings, home healthcare environments, and clinicians' offices. Clinicians may include, but are not limited to, a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. Additionally or alternatively, remote computer 106 may be physically located in one or more non-clinical environments. Generally, remote computer 106 may be used in environments and in situations where real-time data streaming and/or real-time monitoring may be deployed.

The remote computer 106 may include a handheld device or mobile device, in some embodiments. The remote computer 106 may include, incorporate, and/or be coupled to a scanning device, such as barcode scanners, radio frequency identification (RFID) reading devices, or real-time locating system (RTLS) devices, for example. Scanning devices may be handheld devices, in some embodiments. Exemplary remote computer(s) 106 include personal computers, servers, routers, network PCs, peer devices, other common network nodes, or the like, and may include some or all of the components described above in relation to the server 104. The remote computer 106 may be personal digital assistants or other like devices, in some embodiments.

Continuing, the server 104 is a host from which the streaming platform having an integrated or embedded rule execution operator operates, or which executes computer-executable instructions to run the streaming platform having an integrated rule execution operator, in embodiments. For the purposes of describing the Figures of this Description, the terms "integrated" and "embedded" will be used interchangeably. Components of the server 104 may include, without limitation, a processing unit, internal system memory, and a suitable system bus for coupling various system components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 104 typically includes, or has access to, a variety of computer-readable media. Computer-readable media can be any available media that may be accessed by server 104, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 104. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

The exemplary computing system environment 100 generally includes data stores, shown as data stores 108 and 110. Generally, the data stores 108 and 110 include physical memory that is configured to store information that is encoded as data. In one embodiment, the server 104 includes a data store 108 that is local and communicates with another data store 110 that is remote using the communications network 102. The data stores 108 and 110 provide storage of computer-readable instructions, computer-executable instructions, data structures, program modules, and other data which may support functions and actions undertaken via the server 104. In a distributed computing environment, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular abstract data types.

In one embodiment, one or more of the data stores 108 and 110 store rules utilized by an integrated rule execution operator of the streaming platform where the integrated rule execution operator and the streaming platform are hosted by the server 104. In another example, one or more of the data stores 108 and 110 may support an aggressive caching mechanism employed by the streaming platform at the server 104, so that the streaming platform may temporarily store low complexity data during the process of fusing raw data into enriched information. One or more of the data stores 108 and 110 may be configured to non-permanently store data as a cache to enable improved speed of accessing and retrieving data by the server 104. Additionally or alternatively, the data stores 108 and 110 may facilitate nonvolatile (e.g., data retained through power cycles) or more permanent (e.g., ROM) data storage. Exemplary data stores might store electronic records, electronic health records of patients, transaction records, billing records, task flow records, historical records of events detected by the rule execution operator, chronological records of events instantiated by the rule execution operator, records of instantiated and/or fired events, records of an event being communicated to another computing device or external systems, and the like. In embodiments, one or more of the data stores 108 and 110 are configured to store entity-specific records, each record being specific to one or more related entities, an individual person, one or more related businesses, one or more facilities that have a relationship and/or geographically related in some aspect, or the like.

In embodiments, the server 104 is communicatively coupled to the data stores 108 and 110, and thus the server 104 may access, retrieve, communicate, receive, and update information stored in each of the data stores 108 and 110. The server 104 may also be programmed to perform various tasks using computer-readable instructions stored in one or more of the data stores 108 and 110, for example, including embodiments of methods described hereinafter. For example, the server 104 may be programmed with one or more program modules that facilitate management of specific tasks. Various modules may be specific and specialized depending on the raw data streamed, the type of raw data streamed, the identity and/or type of sources providing the raw data, external systems to which instructions may be sent based on rules (detected, instantiated, and/or fired), or a combination thereof, for example.

In the exemplary computing system environment 100 depicted in FIG. 1, the server 104 may communicate with one or more computing devices, systems, or entities. Exemplary computing devices include remote computer 106, a mobile user device 112 (e.g., a cellular phone, a pager, a smart watch, a tablet, a wearable electronic user identification device such as a badge or bracelet), raw data source(s) 114, an electronic records system 116, and data store 110. The exemplary computing system environment 100 may include, in some embodiments, an alert system, a real-time locating system, a reporting system, and one or more user applications (web-based and/or operating via remote computer 106). The server 104 receives information from and sends information to each of the computing devices, systems, or entities. For example, the server 104 may receive raw data from a raw data source 114 that captures physiologic patient data or takes biological measurements (e.g., vitals) in a hospital setting. In another example, the server 104 may receive raw data from raw data source 114 that monitors a patient environment (e.g., the tilt of a bed, the location of bed rails, a video camera, an infrared camera) in a clinical setting. In another embodiment, the server 104 receives raw data streamed from raw data source(s) 114 encoding atmospheric measurements (e.g., conditions inside the International Space Station or local weather at a wind farm) in real time. In yet another embodiment, the server 104 receives real-time raw data encoding performance and operating information, streamed from raw data source(s) 114 in a self-optimizing network (SON).

Generally, the raw data is communicated to the server 104 in near real time for processing by the streaming platform having the integrated rule execution operator. In one example, the server 104 sends instantiated event notifications and actions to the one or more computer devices, systems, and entities based on instruction from the streaming platform having the integrated rule execution operator. The receipt of raw data, processing of raw data into enriched information, rule detection using the enriched information, rule instantiation, rule firing, and communication of action instructions are all performed in near real time as data is streamed.

Although internal components of the server 104 and the remote computer 106 are not shown in FIG. 1 for simplicity, those of ordinary skill in the art will appreciate that such components and their interconnection are present in the server 104 and the remote computer 106. Accordingly, additional details concerning the internal construction of the server 104 and the remote computer 106 are not further disclosed herein. Moreover, though components may be shown in the singular, it will be understood that embodiments may include a plurality of any of the components shown in exemplary FIG. 1.

Figure 2:
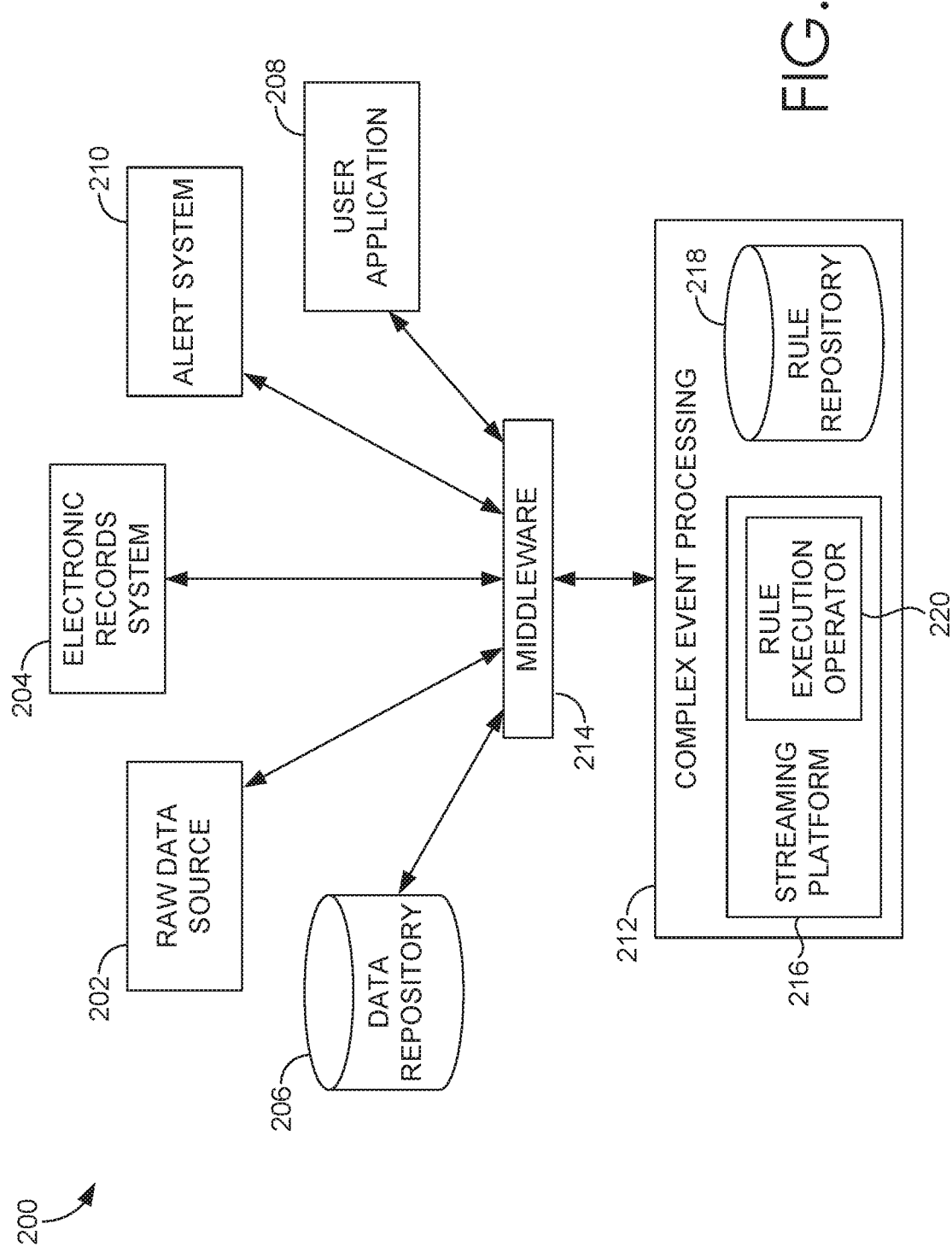
FIG. 2 depicts a diagram of an exemplary streaming environment with a complex event processing system, in accordance with an embodiment of the present invention.

Turning to FIG. 2, an exemplary streaming environment 200 is depicted. The exemplary streaming environment 200 will first be described at a high level. In embodiments, the exemplary streaming environment 200 includes one or more of a raw data source 202, an electronic records system 204, a data repository 206, a user application 208, and an alert system 210. In embodiments, each of raw data source 202, electronic records system 204, data repository 206, user application 208, and alert system 210 may communicate with a complex event processing system 212. In the embodiment of FIG. 2, the exemplary streaming environment 200 includes a middleware component 214 through which communications from the one or more of a raw data source 202, an electronic records system 204, a data repository 206, a user application 208, and an alert system 210 are passed. The complex event processing system 212 of FIG. 2 includes a streaming platform 216, a rule repository 218, and a rule execution operator 220 that is integrated into the streaming platform 216.

In embodiments, raw data source 202 directly or indirectly measures, records, and/or documents one or more real world occurrences or physical phenomenon as they occur. The raw data source 202 may be coupled to and/or include one or more sensors, for example. The raw data source 202 encodes the measurement as raw data. The raw data source 202 streams raw data in near real time to the middleware component 214 and the complex event processing system 212.

In some embodiments, the raw data source 202 directly or indirectly measures and captures electronic information regarding data communications, computing device operations, and/or network performance. For example, information such as a number or type of errors in data communication (e.g., error rate), packet loss, data transmission speed (e.g., bits per minute), processing speeds, throughput, delay, jitter, quality of service characteristics, and the like may be measured and recorded as raw data. Exemplary information may include transactional information, transaction rates, transfer rates, download speeds, computer operations information, measurements of computer performance, downlink and/or uplink information, and the like. The information is encoded by the raw data source 202 as raw data.

Middleware component 214 is a middleware environment which includes computer-executable instructions that, when executed, provide an interface between the complex event processing system 212 and the raw data source 202, electronic records system 204, data repository 206, user application 208, and alert system 210. A middleware component may include or leverage one or more processors configured to perform methods discussed herein. Because the complex event processing system 212 may use a different operating system than the other components illustrated in FIG. 2, the middleware component 214 facilitates the communication of information between the complex event processing system 212 and the other components. The middleware component 214 enables the complex event processing system 212 to access the other components, indirectly in the embodiment of FIG. 2. The middleware component 214 provides at least one service that facilitates communication of raw data to the complex event processing system 212, in embodiments.

The streaming platform 216 of the complex event processing system 212 may be an executable routine or computer programming that collects, via receipt or retrieval, raw data streamed in near real time via the raw data source 202. When currently operating, the streaming platform 216 may be referred to as a runtime. The streaming platform 216 enriches the raw data with contextual information from one or more sources in near real time. The streaming platform enriches streamed raw data with context in near real time and communicates the enriched streamed data to a rule execution operator in near real time. Thus, the streaming platform 216 generates enriched information by adding contextual information obtained from at least one of the electronic records system 204, the data repository 206, the user application 208, and/or the alert system 210, for example, to the raw data streamed from the raw data source 202. As raw data is streamed and fed into the streaming platform 216 in near real time, the streaming platform generates enriched information in near real time.

The streaming platform 216 may use electronic records system 204 to augment the raw data. In processing the raw data being streamed into the streaming platform 216, the streaming platform 216 may access and retrieve relevant information stored in the data repository 206, in embodiments. For example, the streaming platform identifies and recognizes whether there is a relationship between raw data from a raw data source 202 and a record within the electronic records system 204, and caches this relationship as a link. Then, the streaming platform can add context to the raw data using information from the record, for example. The streaming platform 216 may fuse information from one source with a data item from another source when the streaming platform has determined the information is related or relevant or provides an inherence with regard to the data item, thus adding context and generating new, enriched information. The streaming platform 216 may fuse raw data received or retrieved from one or more raw data source(s) including raw data source 202, data repository 206, electronic records system 204, user application 208, and alert system 210, in embodiments. The streaming platform may aggregate raw data and/or enriched information together when a relationship (e.g., a correlation or connection) is identified between the raw data and/or the enriched information.

To facilitate the generation of enriched information from the raw data, the streaming platform may build, in near real time, a plurality of entity-specific records in cache memory using the streamed raw data and/or the enriched information. The entity-specific records store, in cache, raw data and enriched information corresponding to a specific entity (e.g., a person, a place, a facility, a business, a particular computer device, etc.). In one embodiment, entity-specific records include electronic patient-specific records. The entity-specific records may be automatically cleared from cache memory after the expiration of a time period, in some embodiments. The time period may be predetermined or dynamically determined based on a type and number of rules detected, instantiated, fired, a combination thereof, and/or relationships between rules identified by the rule execution operator 220. For example, each of a plurality of entity-specific records held in cache memory may be built by caching an association of an identifier that is unique to a first entity with streamed data identified as corresponding to the first entity. In one embodiment, the entity-specific records may be automatically cleared from cache memory based on a detected event and/or newer, incoming raw data. For example, a detected event which indicates that a patient is currently being discharged could trigger an entity-specific record, corresponding to the patient of the discharge, to be purged from the cache memory.

The streaming platform 216 provides enriched information to the rule execution operator 220 integrated within the streaming platform 216 itself. The rule execution operator 220 leverages the rule repository 218 to access and retrieve rules that the rule execution operator 220 may use to evaluate enriched information for event detection. As enriched information is received, the rule execution operator 220 detects one or more events by evaluating the enriched information using the rules. When an event is detected, an instance of the event is instantiated by the rule execution operator 220. When an event is instantiated and fired, the fired event or corresponding instructions for an action may be communicated to the raw data source 202, electronic records system 204, data repository 206, user application 208, and alert system 210, in embodiments. The event detection is performed in near real time by the rule execution operator 220. In this way, events are detected and fired, in near real time, based on the enriched information that is generated in near real time.

The alert system 210 is a system that communicates an alert, an alarm, or a notification to one or more user devices. Alerts, alarms, and notifications may be sent to user devices to notify a user of an important event or significant development. Alerts, alarms, and notifications may cause the user device, or an ancillary device thereof, to issue an audible noise (e.g., beep, chirp, ring, etc.), haptic vibration, flashing light, a text message, or graphical user interface (GUI) that informs a user of an alert, alarm, or notification, for example.

When an event is instantiated and fired, the fired event or corresponding instructions for an action may be communicated to alert system 210, in embodiments. The alert system 210 may communicate a notification of the alert along with relevant information regarding the alert and/or the instantiated event to a user device, user application 208, data repository 206, and/or raw data source 202, for example.

The raw data source 202 may utilize the alert to modify how raw data is being captured and streamed to the streaming platform 216, in embodiments. Additionally or alternatively, a raw data source 202 may utilize the alert to modify how raw data is being captured and streamed to the streaming platform 216 by other data sources, in some embodiments. In one embodiment, data repository 206 stores a record of the alert, relevant information, and/or the corresponding instantiated event triggering the alert.

Figure 3:
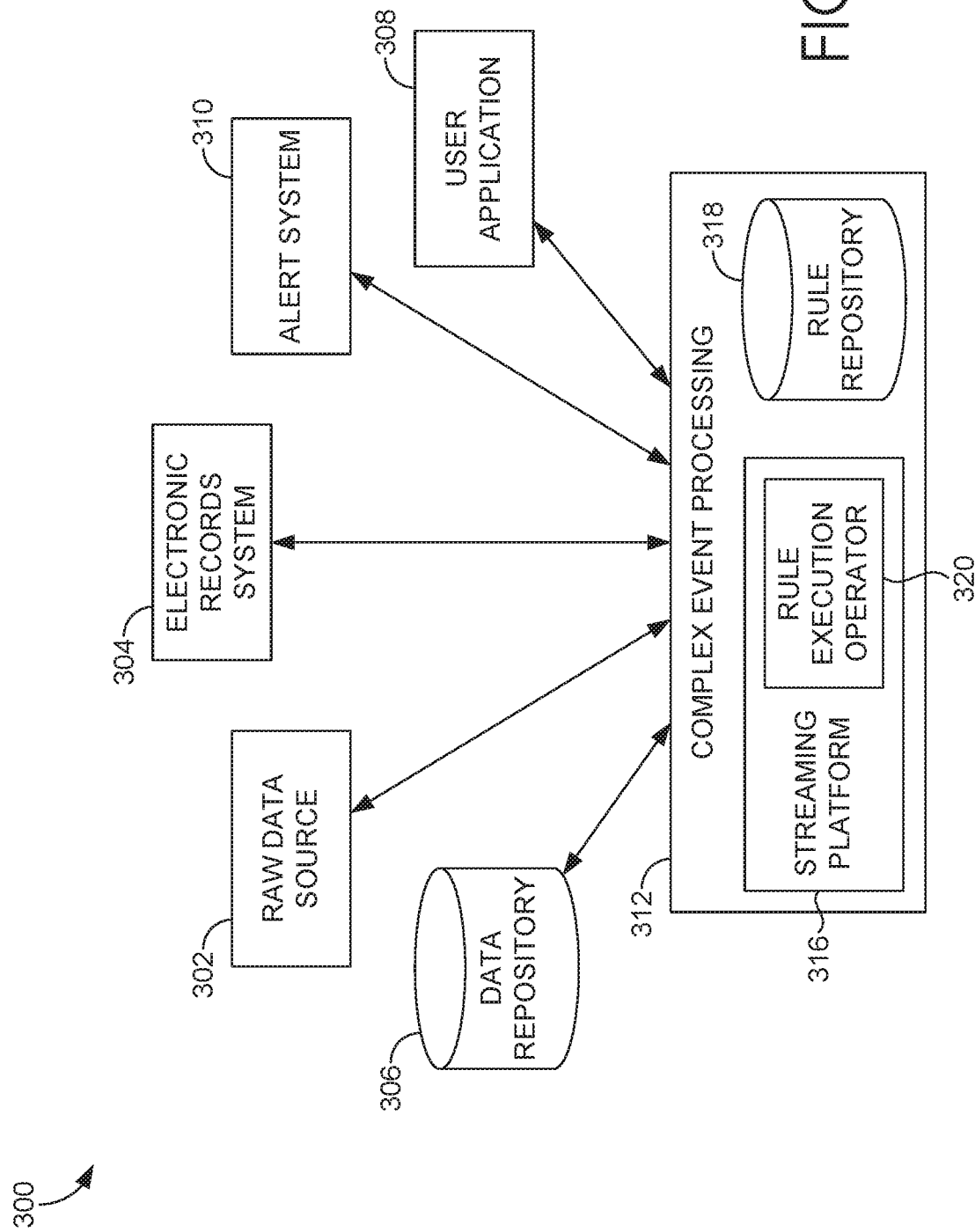
FIG. 3 depicts a diagram of an exemplary streaming environment with a complex event processing system, in accordance with an embodiment of the present invention.

In an alternative embodiment, illustrated in FIG. 3, an exemplary streaming environment 300 may operate without a middleware component. The exemplary streaming environment 300 of FIG. 3 includes one or more of a raw data source 302, an electronic records system 304, a data repository 306, a user application 308, and an alert system 310. In embodiments, each of raw data source 302, electronic records system 304, data repository 306, user application 308, and alert system 310 may communicate with a complex event processing system 312. In the embodiment of FIG. 3, the exemplary streaming environment 300 does not include a middleware component. The complex event processing system 312 of FIG. 3 includes a streaming platform 316, a rule repository 318, and a rule execution operator 320 that is integrated into the streaming platform 316. The exemplary streaming environment 300 and the components therein operate similar to those discussed above with regard to FIG. 2.

Figure 4:
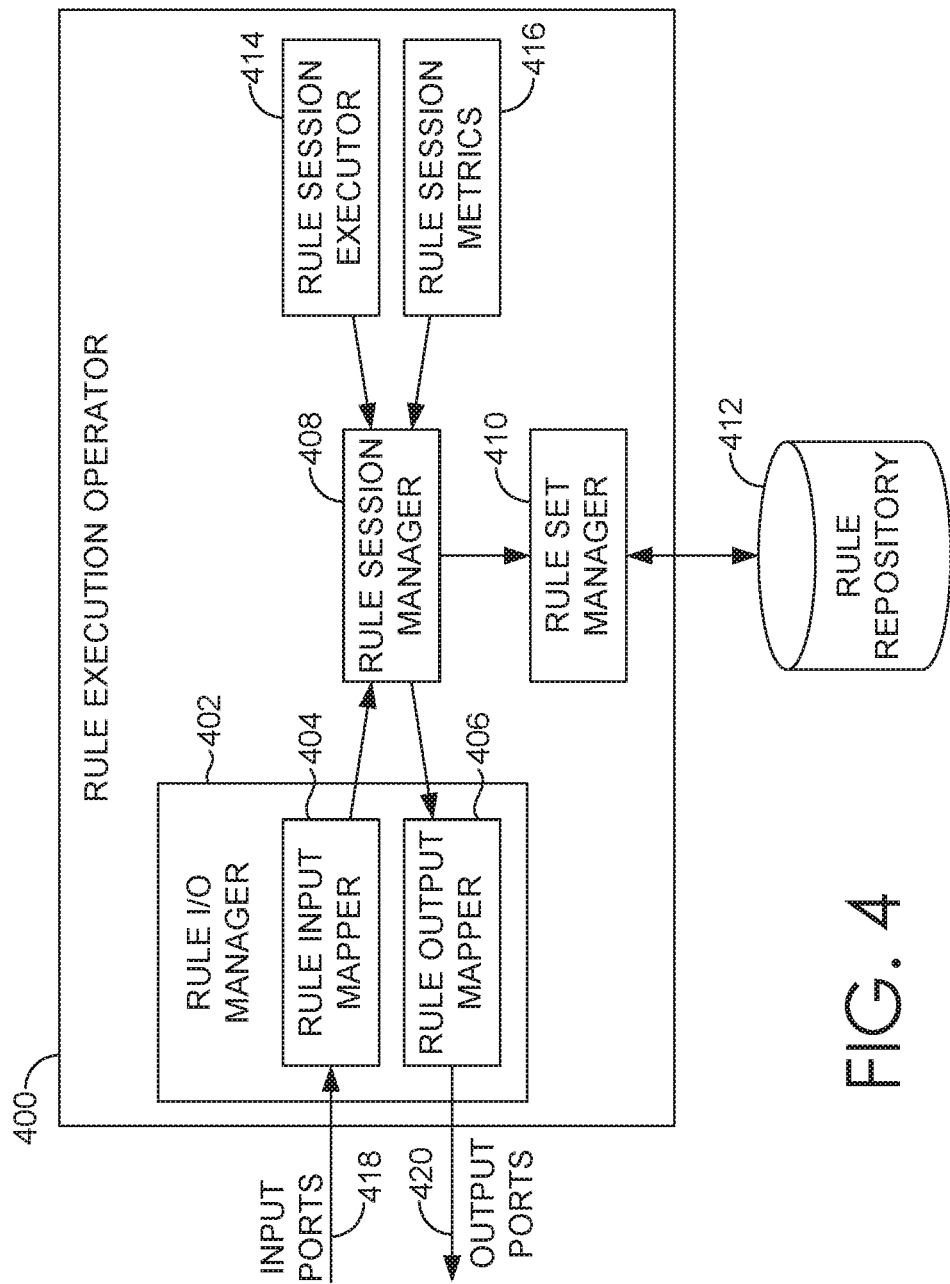
FIG. 4 depicts a diagram of an exemplary integrated rule execution operator, in accordance with an embodiment of the present invention.

Continuing to FIG. 4, a diagram of an exemplary rule execution operator 400 is illustrated. In embodiments, the rule execution operator 400 corresponds to the rule execution operator 220 of FIG. 2. Generally, the rule execution operator 400 is integrated within the streaming platform. The rule execution operator 400 is configured to execute one or more rules of the plurality of rule sets in a rule repository against the enriched information to detect an event and, when an event is detected, communicate a notification of the event to the streaming platform. The rule execution operator 400 includes a rule input/output (I/O) manager 402, a rule input mapper 404, a rule output mapper 406, a rule session manager 408, a rule set manager 410, a rule repository 412, a rule session executor 414, and rule session metrics 416. Generally, the rule execution operator 400 is communicatively coupled to one or more input ports 418 and output ports 420, which communicatively connect a streaming platform to the rule execution operator 400. It should be noted that the input ports 418 include input streams and the output ports 420 include output streams, in embodiments.

The rule execution operator 400 comprises software and/or hardware that operate to execute one or more rule sets against enriched information provided by a streaming platform. A plurality of rule sets may be stored within a rule repository 412, for example, in persistent memory. One or more rule sets may be stored remotely and/or locally with regard to the rule execution operator 400. In embodiments, the rule sets are externally defined, meaning that a user may create or build rule sets tailored to the user's implementation of a streaming platform. In this way, the rule execution operator 400 is dynamic, using customized or tailored rule sets to support diverse streaming platform environments.

Rule I/O manager 402 includes the rule input mapper 404. The rule input mapper 404 generally operates to receive a stream of enriched information from a streaming platform, via one or more input ports 418. The rule input mapper 404 may receive enriched information and create fact sets. In one embodiment, the rule input mapper 404 transforms raw data and/or enriched information into fact sets, which include information in the form of tuples. In one embodiment, the rule input mapper 404 transforms tuples of raw data and/or enriched information into fact sets, where a tuple is an ordered set of values. Exemplary tuples are n-tuples (e.g., a 3-tuple (2, 9, 5), a 5-tuple (8, 4, 1, 8, 9)), where n is an integer. Tuples are an exemplary technique that can be used to capture information, as each 'place' in the ordered set represents a variable (e.g., a parameter or attribute), and each value captures information with regard to the variable or parameter. Tuples represent just one technique that may be used to organize information that is streamed into the rule execution operator 400 via the streaming platform.

The fact sets of enriched information are mapped to one or more sessions based on, for example, a shared origin source or entity identifier as specified in an entity-specific record held in cache by the streaming platform. As used herein, as session is a portion of working memory where related facts and/or events may be stored, such that each session has a piece of working memory that is designated to that particular session. By partitioning fact sets of enriched information (e.g., including raw data) into one or more sessions, the rule execution operator 400 is able to work with increased efficiency. Additionally, partitioning fact sets of raw data and/or enriched information into sessions, working memory may be distributed in parallel across one or more computing nodes in a network, which increases the amount and availability of working memory, in embodiments. As such, the rule execution operator 400 exhibits increase throughput and improved higher performance.

Continuing, while the initial raw data was obtained by the streaming platform from distinct external sources and/or various operating interfaces, the transformation performed by the rule input mapper 404 generates data and/or fact sets that are "blind" to differences in source so that rules may be universally applicable within the rule execution operator 400 environment, in embodiments. The rule input mapper 404 may group and/or partition enriched information based on one or more shared identifiers and/or one or more relationships identified or created via the contextual enhancement of the streaming platform. In some embodiments, contextual enhancement may include the creation and maintenance, in cache memory, of a relational index linking multiple diverse sources (e.g., raw data sources, a remote data repository, an electronic record system) that may otherwise lack interoperability and/or which use incompatible operating interfaces. Such a relational index may be leveraged by the rule input mapper 404 to determine partitioning the enriched information into fact sets and sessions.

Generally, the rule input mapper 404 may group and/or partition enriched information that share the same or similar patient identifier into. In one embodiment, the rule input mapper 404 of the rule execution operator 400 assigns enriched information to a plurality of sessions such that each of the plurality of sessions corresponds to a different and distinct entity identifier (e.g., a unique patient identifier, a particular encounter identifier, a transaction identifier). In this way, enriched information that shares a common identifier or attribute, for example, may be grouped together and kept separate or isolated from other enriched information that does not share the common identifier or attribute. As each session has a corresponding portion of designated working memory, the enriched information that shares the common identifier may be held separate from other enriched information lacking the common identifier, as partitioned into other concurrently existing sessions having their own designated working memory. In some embodiments, working memory may be distributed across one or more computing nodes in a network. By leveraging all of the working memory spread across multiple computing nodes as support for sessions, memory capacity and availability is increased and throughput of the streaming platform and/or rule execution operator 400 is boosted.

In one example, only enriched information that shares a unique patient identifier may be partitioned into the same single session so that enriched information for other patients does not contaminate the session. In another example, the rule input mapper 404 may group and/or partition enriched information that share the same or similar device identifier, patient identifier, location identifier (e.g., medical transport vehicle, room, building, campus, and/or city), time stamp (e.g., raw data received close in time) and/or internet protocol (IP) address. In yet another example, the rule input mapper 404 may group and/or partition enriched information that share the same or similar parsed text (e.g., a word, a sequence of letters, a social media hashtag, etc.). As fact sets are created by the rule input mapper 404, the fact sets are designated for session creation or session assignment and are provided to the rule session manager 408. Additionally or alternatively, the rule session manager may also partition enriched information into a plurality of sessions.

The rule session manager 408 manages the creation and destruction of sessions that include fact sets. The rule session manager 408 creates a session for one or more fact sets received from the rule input mapper 404. Each session may have a unique identifier. The rule session manager 408 utilizes sessions to track various fact sets as rules are selected and executed against the various fact sets. The rule session manager 408 stores, in each session, information regarding a fact set specific to that session, whether rules have been executed against that particular fact set yet (e.g., state of a fact set), which rules were executed against that particular fact set (i.e., rule identity), whether any events have been detected, and if so, what specific events were detected, for example. The rule session manager 408 may also partition fact sets into separate and distinct sessions, alone or in tandem with the rule input mapper 404. As streamed enriched information is mapped into fact sets, multiple sessions are created and coexist together in the rule execution operator 400. Because the rule session manager 408 facilitates the creation and tracking of multiple concurrent sessions within the rule execution operator 400, the performance of the rule execution operator 400 is enhanced. Speed and throughput of the streamed enriched information in the rule execution operator 400 is improved by partitioning fact sets into sessions, as performed by the rule session manager 408.

The rule session manager 408 also destroys sessions. In embodiments, a session may be destroyed after successful communication to the rule output mapper 406, for example. In some embodiments, sessions may be destroyed after a period of time lapses (e.g., an inactivity timeout, a preconfigured timeout). Exemplary situations resulting in a session teardown based on a timeout may include: new facts and/or facts sets are not added to a particular session; a session is not modified; and/or a session is configured to automatically teardown. A period of time may be defined automatically by the rule execution operator 400 and/or manually by a user, in embodiments. Session destruction may be governed by additional rule sets. The rule session manager 408 may continuously, periodically, or upon a user indication, determine whether one or more sessions should be destroyed or torn down. Timely session destruction by the rule session manager 408 is important for maintaining optimal processing of fact sets and preventing consumption of excessive amounts of memory (e.g., resulting in a crash). In addition to creating sessions, the rule session manager 408 may concurrently operate to search and identify expired sessions (e.g., those sessions that have timed out) for immediate or scheduled destruction. The rule session manager 408 may communicate with other components of the rule execution operator 400 to notify the other components when sessions are created and/or destroyed. It should be noted that the rule input mapper 404 may destroy sessions as well.

The rule session manager 408 communicates with rule set manager 410. The rule set manager 410 is an application program interface (API), in embodiments. Generally, the rule set manager 410 defines usage of a plurality of rule sets stored in the rule repository 412. The rule set manager 410 operates to access one or more rules and/or rule sets stored in the rule repository 412 and loads the one or more rules and/or rule sets for execution against sessions having fact sets. The rule set manager 410 may search for and retrieve one or more rule sets from the rule repository 412. In embodiments, the rule set manager 410 may select one or more rule sets for execution against each session, where rule sets may be specially selected based on information and characteristics of fact sets within a session. For example, the rule set manager 410 may specifically identify one or more rules for execution against a session based on content of the fact set. Rule selection is highly specific and customized to the streaming platform environment. The rule session manager 408 may select rules based on one or more of a fact set, a session, a previously selected rule, a previously executed rule, a previously detected event, a previously fired event, or a combination thereof. The rule session manager 408 may select rules based on an occurrence of the one or more of a fact set, a session, a previously selected rule, a previously executed rule, a previously detected event, and/or a previously fired event. The rule session manager 408 may select rules based on an occurrence, within a specified period of time, of the one or more of a fact set, a session, a previously selected rule, a previously executed rule, a previously detected event, and/or a previously fired event. The rule session manager 408 may, therefore, exhibit temporal reasoning in selecting one or more rule sets for execution against various active sessions.

Together, the rule session manager 408, the rule set manager 410 and/or the rule input mapper 404 further enhance the performance of a streaming platform that integrates the rule execution operator 400. For example, the rule input mapper 404 may request, retrieve, and/or receive additional data and information from other systems as part of the process of creating a fact set. In embodiments, the rule input mapper 404 communicates with a middleware component to retrieve supplemental information from one or more of a data repository, raw data source, electronic records system, alert system, and/or user application. The supplemental information is then transformed, along with the enriched information, to generate fact sets for a session. The rule input mapper 404 may insert supplemental information into existing sessions, in some embodiments. Accordingly, the rule input mapper 404 may update individual facts and/or fact sets in existing sessions by leveraging external resources. In a further embodiment, the rule input mapper 404 may monitor one or more external sources to identify and receive updates for one or more specific sessions and/or fact sets assigned to a session. The rule input mapper 404 identifies when changes have occurred or are occurring with regard to a fact that is mapped to a current session. The rule input mapper 404 may then update the particular fact within the current session so that the particular fact reflects the identified change(s). By facilitating updates and additions to facts in existing sessions in near real time, new rules, additional rules, or various rule application logic may be triggered with regard to a particular existing session having an updated or new fact, in some embodiments. The rule input mapper 404 may utilize the session identifier, created by the rule session manager, to track individual sessions, fact sets, and/or facts and update individual sessions, fact sets, and/or facts, in some embodiments. For example, a specialized cache and application program interface may be used to store session identifiers and fact set information, so that the rule input mapper 404 may update and add supplemental information to a specific existing session and so that the rule set manager 410 may re-evaluate whether new rules, additional rules, and/or special rule logic should be applied to the same existing session, based on the supplemental information that modifies the fact sets of a session. Because the rule execution operator is operating in near real time, it should be noted that the insertion of supplemental information or modification of fact sets in near real time enables the rule execution operator 400 to respond to changing circumstances immediately. Thus, the rule execution operator 400 is flexible and dynamic because the rule execution operator 400 is responsive and reactive to the enriched information as the enriched information is streamed into the rule execution operator 400.

Continuing, the rule set manager 410 may examine or scan the rule repository 412 for updates to rule sets, deletion or removal of rule sets from the rule repository 412, and new or added rule sets. The rule set manager 410 may perform the examination periodically or in response to a direct request from a user, for example.

The rule session executor 414 manages and executes rules and/or rule sets against each session. The rule session executor 414 executes rules, as selected by the rule set manager for each particular session, fact set, and/or fact, against the session, the fact set, and/or the fact. Generally, the rule session executor 414 works on a batched basis, meaning that all the rules that were selected for execution against any portion of the session content (e.g., fact sets and individual facts) are evaluated together. Thus, one or more rules may be executed against facts within a session; however, every fact and fact set in the session is evaluated against a corresponding selected rule(s) concurrently. As such, in embodiments, all of the rules that are to be applied to one particular session may be executed together, in parallel. In contrast, a non-batched basis would involve executing all rules that were selected for execution against one single fact, such that one fact is processed at a time. The rule session executor 414 ensures that rules are executed against sessions in near real time. As rules are executed against a session, events may be detected. When an event is detected, an event is instantiated or "fired." In some embodiments, the rule session executor 414 executes rules against sessions at periodic intervals or on a reoccurring basis, in order to ensure that all sessions are evaluated. As events are detected and fired, a notification of the instantiated (i.e., "fired") event is provided to the rule output mapper 406.

The rule output mapper 406 transforms instantiated events into an output stream in near real time. The output stream is provided by the rule output mapper 406 to the streaming platform, via one or more output ports 420. In this way, when an event is detected based on the execution of at least one rule against the enriched streamed data, a notification of the event is communicated to the streaming platform, in embodiments. The rule I/O manager 402 determines which mappers should be created based on the streaming data.

Rule session metrics 416 are captured and stored information regarding all performance and operational aspects of the rule execution operator 400. Through the rule session metrics 416, an administrator or user has access to session information, session count, fact sets information, fact set count, fact information, fact count, and the like. Thus, the performance of the rule execution operator 400 is rendered 'visible' to an administrator or user by way of the rule session metrics 416. Performance metrics may be captured in near real time.

Figure 5:
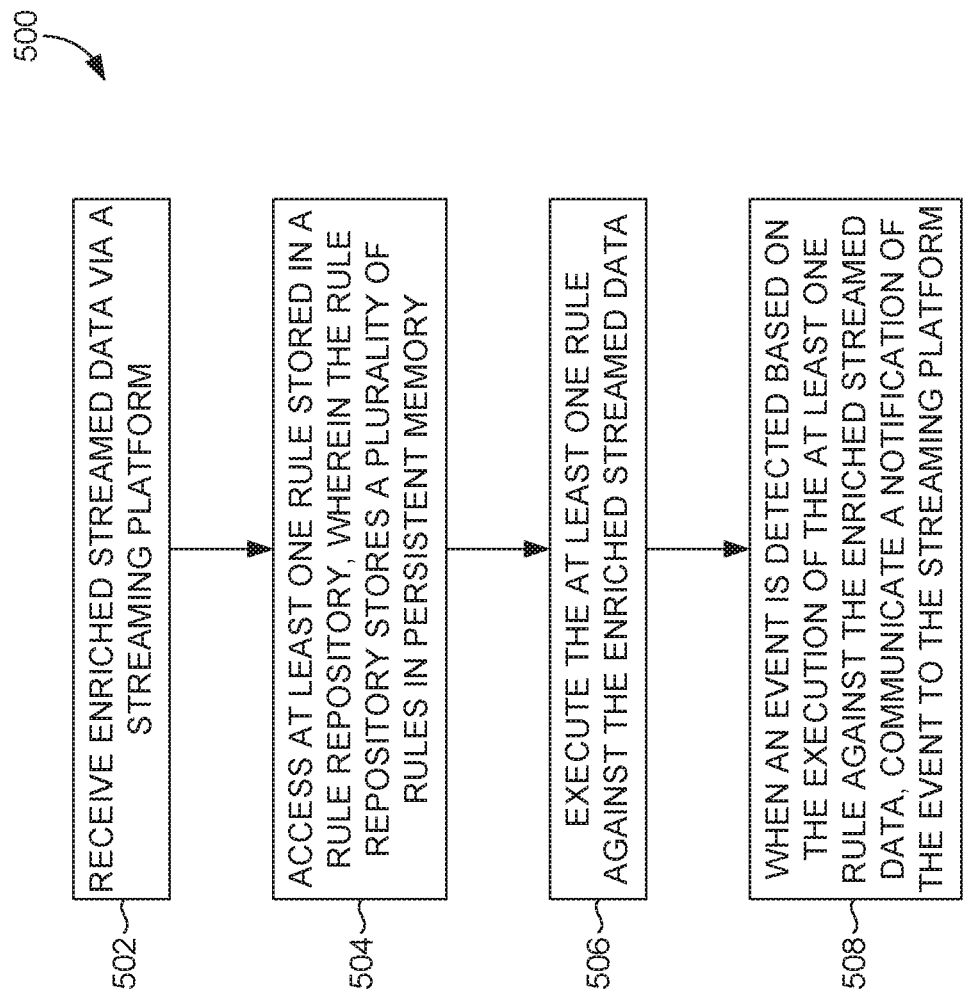
FIG. 5 depicts an exemplary method for event detection in a complex event processing system, in accordance with an embodiment of the present invention.

FIG. 5 depicts a method 500 for complex event processing. At a high level, the method 500 includes receiving enriched streamed data via a streaming platform at block 502. Then, the method 500 accesses at least one rule stored in a rule repository, wherein the rule repository stores a plurality of rules in persistent memory, as shown at block 504. At least one rule is executed, at block 506, against the enriched streamed data. In accordance with the method 500, when an event is detected based on the execution of at least one rule against the enriched streamed data, a notification of the event in communicated to the streaming platform, as illustrated at block 508.

Figure 6:
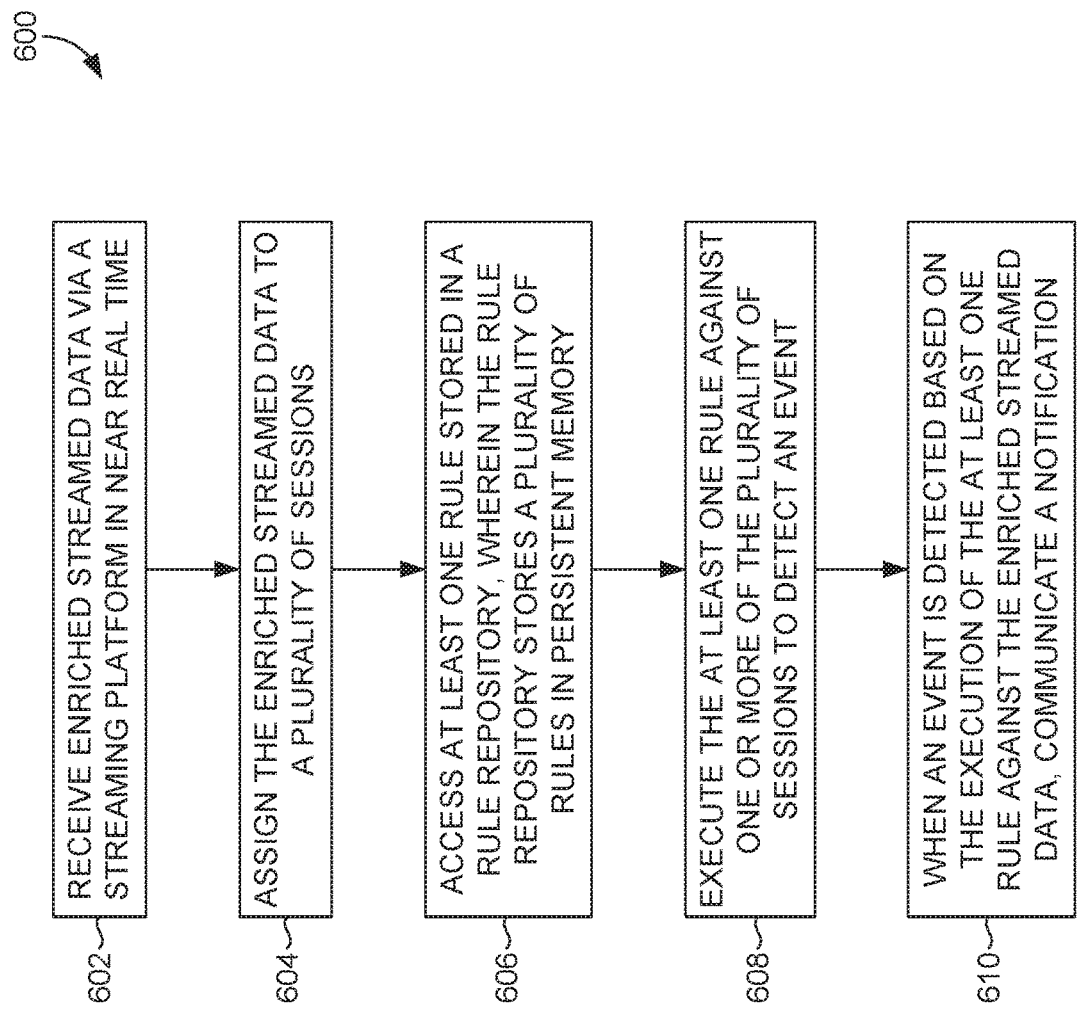
FIG. 6 depicts an exemplary method for event detection in a complex event processing system, in accordance with an embodiment of the present invention.

In the method depicted in FIG. 6, the method 600 is performed via a rule execution operator integrated within a streaming platform. At block 602, enriched streamed data is received via a streaming platform in near real time. The enriched streamed data is assigned to a plurality of sessions, as shown in block 604. The method 600 continues by accessing at least one rule stored in a rule repository, wherein the rule repository stores a plurality of rules in persistent memory, at block 606. Then, at block 608, the method 600 executes at least one rule against one or more of the plurality of sessions to detect an event. When an event is detected based on the execution of at least one rule against the enriched streamed data, a notification of the event is communicated to the streaming platform, as indicated at block 610.

Figure 7:
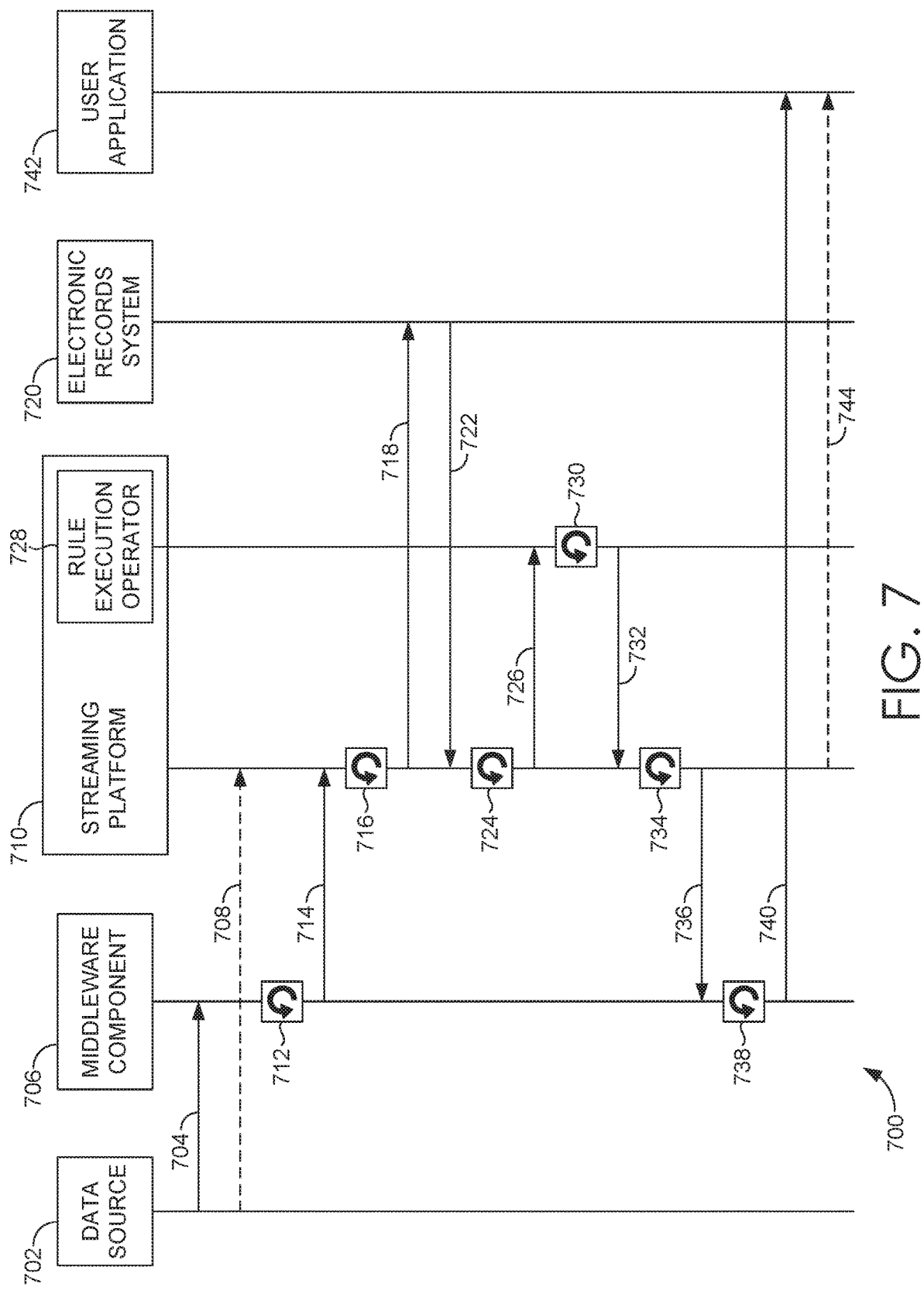
FIG. 7 depicts a flow chart for event detection in a complex event processing system, in accordance with an embodiment of the present invention.

Turning to FIG. 7, an exemplary flow diagram is shown depicting a method 700 that may be performed using the systems described herein. The method 700 is performed in near real time, and continues in near real time as data is continuously streamed by the streaming platform. A data source 702 captures information and encodes it as raw data, in near real time. The data source 702 communicates 704 the raw data to a middleware component 706 such that the raw data is streamed to the middleware component 706. In an alternative embodiment lacking the middleware component 706, the raw data is communicated 708 directly to a streaming platform 710. This step of an alternative embodiment is shown using a dashed line. In the embodiment shown in FIG. 7, the middleware component 706 normalizes 712 the raw data and communicates 714 the streamed raw data to the streaming platform 710 for contextual enrichment. The streaming of raw data from the data source 702 to the middleware component 706 and on to the streaming platform 710 continues in near real time as the data source 702 captures and electronically encodes information.

The streaming platform 710 analyzes 716 the raw data and sends a request 718 to an electronic records system 720 for information relating to the raw data and/or the data source 702. For example, the streaming platform 710 sends a healthcare device identifier from a raw data source to the electronic records system 720 with a request to identify a patient that is associated with a healthcare device to which the healthcare device identifier corresponds. The electronic records system 720 returns 722 information. The streaming platform 710 caches 724 the information and any relationship between the data source 702, the raw data, and the information from the electronic records system 720. The streaming platform 710 can utilize the cached relationship to associate subsequently received raw data, which continues to be streamed to the streaming platform 710, with the information from the electronic records system 720. The cached relationship may persist for a predetermined period of time or until streaming of the raw data is interrupted or terminated, automatically or manually, for example. Each cached relationship may be stored as an entity-specific record, each record being specific to one or more related entities, an individual person, one or more related businesses, one or more facilities that have a relationship and/or geographically related in some aspect, or the like.

The streaming platform 710 also contextually enhances the raw data by adding and/or fusing the raw data with one or more of the following: raw data from another raw data source, information from the electronic records system 720, information from a data repository (not shown), user input from a user application, and/or alert information from an alert system. Using information from multiple resources enables the streaming platform 710 to add meaning and context to the initially raw data, as well as make inferences by aggregating and fusing the information from multiple resources with the raw data. In embodiments, the streaming platform 710 may obtain information directly, or indirectly through the middleware component 706. The enriched information produced by the streaming platform 710 can further be used to supplement one or more cached entity-specific records, in some embodiments.

Figure 8:
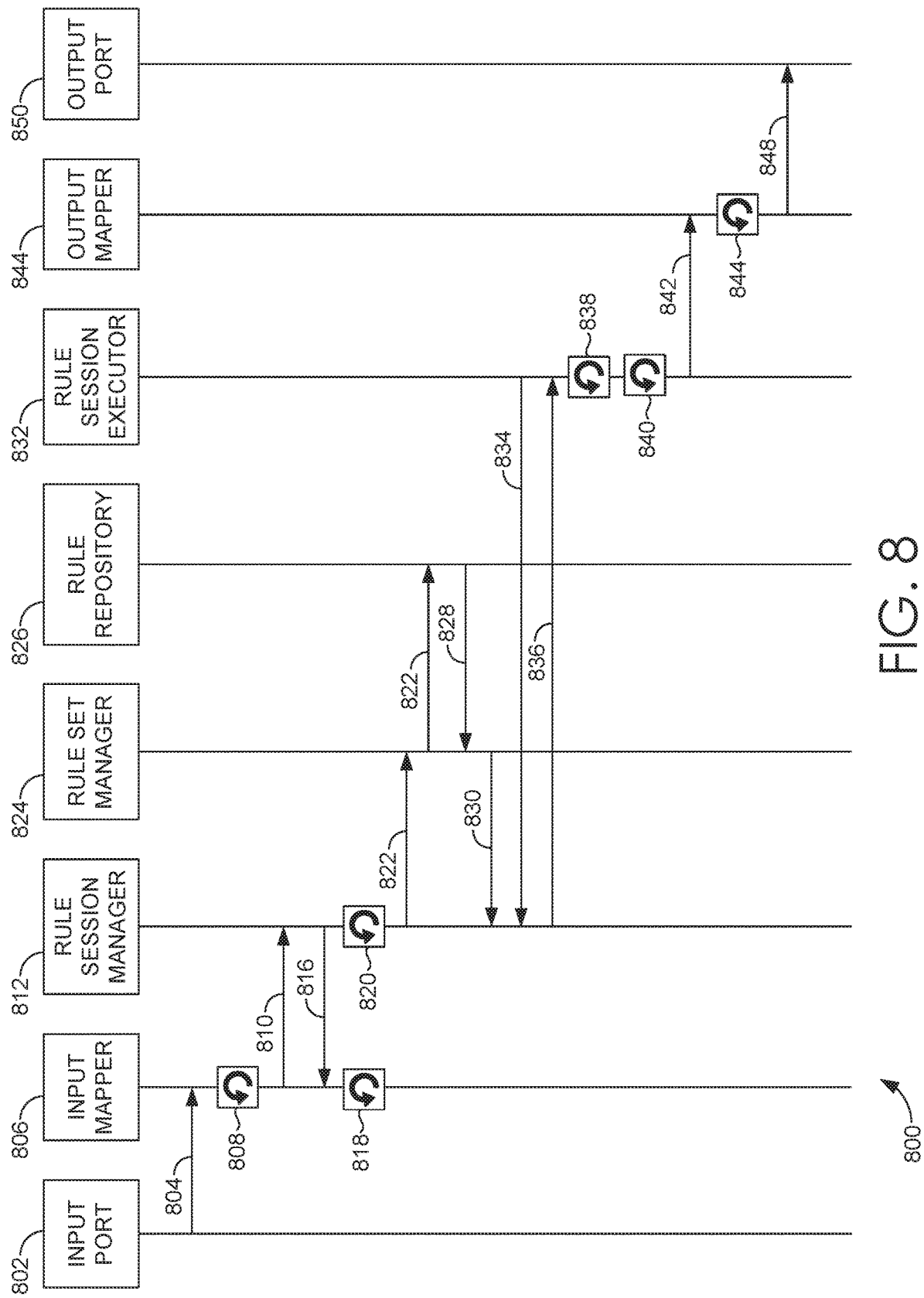
FIG. 8 depicts a flow chart for event detection in a complex event processing system, in accordance with an embodiment of the present invention.

The enriched information is communicated 726 to the rule execution operator 728, which is a layer within the streaming platform 710 itself. The rule execution operator 728 executes 730 rules against the enriched information, as shown in the exemplary flow diagram of the method 800 of FIG. 8. In FIG. 8, an input port 802 (e.g., one or more input data streams) provides 804 the enriched information from the streaming platform 710 of FIG. 7 to the rule execution operator 728. The method 800 is performed in near real time, and continues in near real time as data is continuously streamed by the streaming platform. As will be understood, the diagram of FIG. 8 depicts an exemplary "order" of communications which are illustrative only. In various embodiments some communications and/or processes may occur asynchronously or in parallel. The order presented is an example that simplifies the timing of communications and/or processes. As such the order is not meant to be limiting to the claimed embodiments, but has been structured in this Description to provide clarity and coherency to the reader. Accordingly, each of the processes of in FIG. 8 may be performed synchronously (e.g., wait to finish process before beginning another task) or asynchronously (e.g., do not need to finish process before starting another task).

An input mapper 806 of the integrated rule execution operator receives the enriched information. The input mapper 806 transforms 808 the enriched information as previously described and assigns the enriched information to one or more existing sessions. To do so, the input mapper 806 uses the enriched information (e.g., patient identifier, device identifier) to determine which sessions should be located and updated with the new enriched information, in various embodiments. The input mapper 806 contacts 810 the rule session manager 812 to locate those specific sessions for updating. The rule session manager 812 shares 816 the locations of the desired sessions with the input mapper 806, and the input mapper 806 directly inserts 818 new raw data and/or new enriched information into sessions in order to update facts in sessions. In some embodiments, the rule session manager 812 may create 820 new sessions, as needed, to support the input mapper 806. In embodiments where the rule session manager 812 creates a new session, the rule session manager 812 contacts 822 the rule set manager 824 to determine what rules should be run against the newly-created session. The rule set manager 824 may identify and request 820 one or more rules from a rule repository 826, which the rule repository 826 returns 828 to the rule set manager 824. The one or more rules may be communicated 830 to the rule session manager 812, for example, to be applied to the new session.

The components shown in FIG. 8 perform these actions as data is continuously streamed. As sessions are updated 818 by the input mapper, the rule session executor 832 contacts 834 the rule session manager 812 to determine what sessions currently exist or are currently active. The rule session executor 832 is provided 836 information on current sessions. The rule session executor 832 may contact the rule session manager 812 for this purpose automatically, intermittently, periodically, based on the rate that data is streamed, and/or based on the volume of data streamed. The rule session executor 832 then fires 838 against each active session on separate threads of execution. To improve the performance of the streaming platform and rule execution operator, the session updates, new session creation, and rule execution may be performed asynchronously.

When an event is detected 840, the event may trigger activation of one or more rules or trigger deactivation of one or more rules. New rules may be activated, for instance, to be executed against particular sessions based on a session identifier and/or the particular event detected. Event-detection activated rules may be executed against the same session and/or another session. In some embodiments, event-detection activated rules may be executed against subsequently created sessions. In embodiments, one or more rules may be deactivated when a particular event is detected, such that event-detection deactivated rules are blocked from execution against the same and/or another session, for example, having a particular session identifier associated with the event that has been detected. Accordingly, event detection may provide feedback to the rule execution operator 728 itself, in near real time, such that the rule execution operator 728 modifies its own application or non-application (e.g., rule blocking) of the same rules and/or other rules, in various embodiments.

For example, the rules applied via the rule execution operator are flexible and dynamic. A rule may detect an occurrence of an event based on presence of information (e.g., if X, then event Y). A rule may operate based on inferences (e.g., if X and Y, instantiate an event to correlate X and Y to one another). Rules also exhibit temporal reasoning that is dynamically responsive to changes, patterns, and/or trends present in enriched information and/or raw data. Rules may include edges or thresholds (e.g., if X changes to a user-defined value of Z, instantiate an event). Rules may respond to plateaus, or a lack of change (e.g., if X does not change within a specific period of time). Rules may be complex and compound, such that a single rule may consider multiple inferences, edges, trends, and/or plateaus in order to detect one or more events, for example. Moreover, rules may use sophisticated temporal reasoning to account for relationships between data and time. For example, based on the enriched information in a session, if Y happens within Z seconds of X happening, detect and fire event A. In another example, if X occurs but Y does not occur within timeframe Z, then detect and fire event B.

Rules may consider whether one session relates to another previous session, whether previously enriched information relates to new incoming raw data, whether concurrent active sessions are related, for example. Thus, rules may be retrospective or predictive. Rules may account for specific time frames, whether predetermined, event specific, external source specific, and/or defined by a user, for example. These examples are illustrative and simplified for the purpose of discussion and should not be construed as limiting.

When an event is detected 840 as shown in FIG. 8, the rule execution operator instantiates the event (e.g., creates an instance of an event). In accordance with some rules, the rule execution operator may block, prevent, and/or disregard the instantiation of the event. The rule execution operator may analyze the event instantiation and determine whether to active, deactivate, maintain, or monitor one or more other rules with regard to other sessions, for example. The event instantiation may include or may be accompanied by instructions based on the event. The event instantiation is communicated 842 to the output mapper 844. The output mapper 844 transforms 846 the instantiated event into output and sends 848 the output to an output port 850. The output port 850 provides the output to a streaming platform into which the rule execution operator has been integrated.

Returning to FIG. 7, the streaming platform 710 receives output sent 732 by the rule execution operator 728. In embodiments, the output includes a notification of a detected event sent to the streaming platform from the rule execution operator. Upon receiving such a notification, the streaming platform may identify one of a plurality of entity-specific records in cache memory that corresponds to the notification and/or the detected event to which the notification corresponds, in some embodiments. The streaming platform 710 may analyze 734 the output and generate event-specific instructions and/or destination-specific instructions based on the output, including instantiated events and external sources to be notified (e.g., destinations) of instantiated events. The streaming platform 710 communicates 736 instantiated events and/or instructions to the middleware component 706. The middleware component 706 processes 738 the received information. The middleware component 706, upon receiving instantiated events and/or instructions, performs actions that are responsive to the instantiated events, performs actions specified in the instructions, and/or generates additional instructions to be communicated to external sources for performance via the external sources. The middleware component 706 communicates 740 instructions, for example, to an external source, such as a user application 742. In alternative embodiments lacking the middleware component 706, the streaming platform 710 communicates 744 instantiated events and/or instructions directly to external sources. In yet another embodiment, the streaming platform 710 may communicate instantiated events and/or instructions directly to some external sources while communicating instantiated events and/or instructions to a middleware component 706 as well, for subsequent communication to some external sources.

The methods are performed so that events are instantiated and/or instructions to external sources are generated in near real time relative to the initial receipt of raw data from which an event is detected. Accordingly, the exemplary methods are performed in a continuous or ongoing manner to account for the steady influx of a large amount of raw data being streamed. Accordingly, different steps of each method may occur concurrently and on a rolling basis, as raw data is successively received and different sessions are created and batch-processed in near real time. As new raw data flows into the streaming platform for enrichment, instantiated events detected from enriched information flow out to external sources where actions may be performed.

Figure 9:
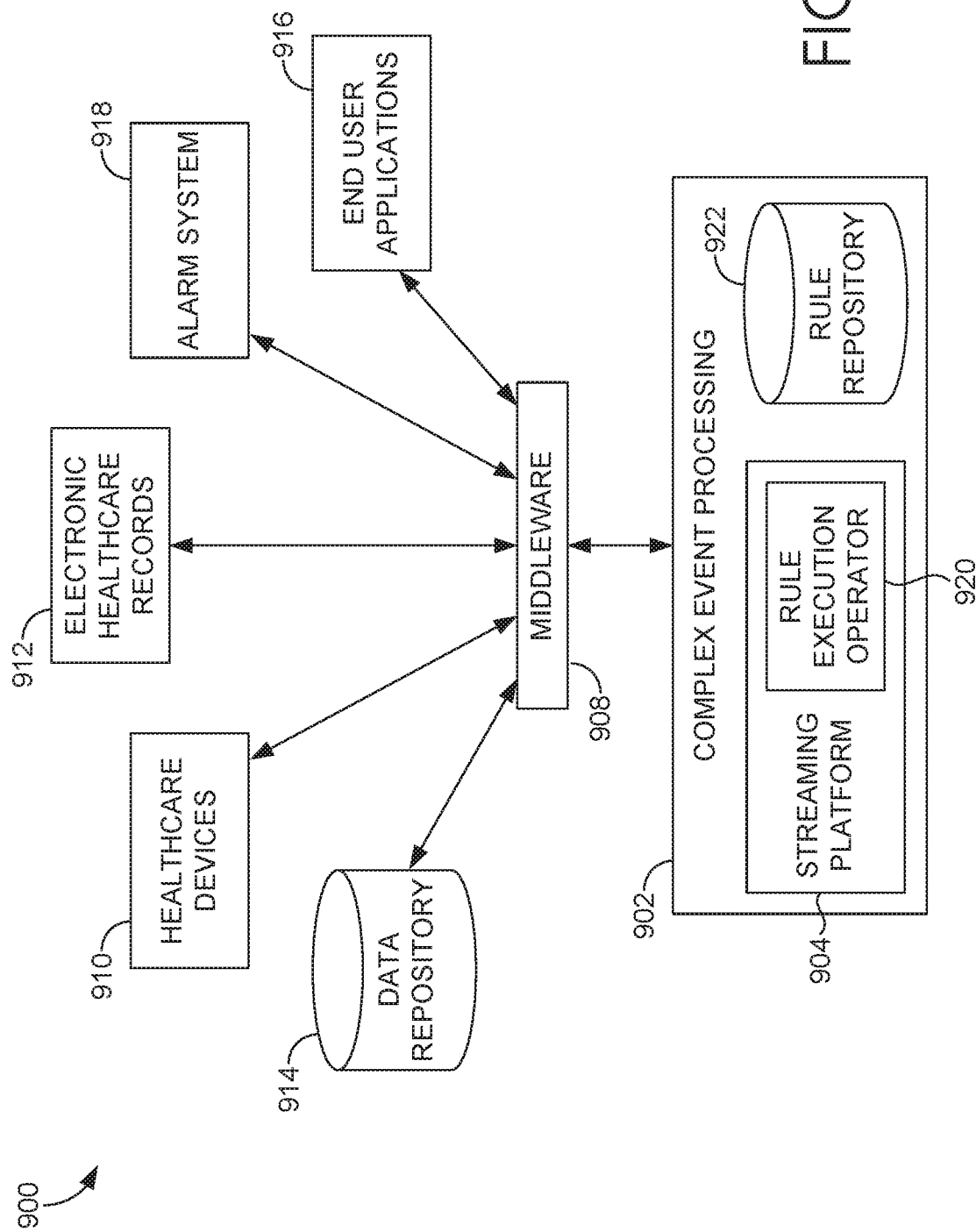
FIG. 9 depicts an exemplary streaming environment with a complex event processing system, in accordance with an embodiment of the present invention.

FIG. 9 depicts an exemplary streaming environment 900 that is illustratively deployed for use in a clinical environment. The exemplary streaming environment 900 includes a complex event processing system 902 that includes a streaming platform 904 with an integrated rule execution operator 920. In FIG. 9, the complex event processing system 902 is communicatively coupled to a middleware component 908 that manages the flow of information into and out of the complex event processing system 902. In embodiments, the middleware component 908 provides an interface between the complex event processing system 902 and multiple healthcare devices 910, a plurality of electronic health records 912, one or more data repositories 914, end user applications 916 at remote computing devices, and an alarm system 918.

In embodiments, multiple healthcare devices 910 supply raw data to the middleware component 908 in real or near real time. For example, one of the multiple healthcare devices 910 may capture measurements corresponding to a first patient's vital signs, and as those vital sign measurements are made, the healthcare device may electronically encode the measurements as raw data and stream the raw data to the middleware component 908.

The multiple healthcare devices 910 may include devices of any make, model, and type. Exemplary healthcare devices include an infusion pump, vital signs capturing devices, a blood pressure cuff, a heart rate monitory, a respiratory status device, peripheral capillary oxygen saturation (SPO2) devices, sensors, and other devices capable of real-time physiological monitoring and/or real-time geo-location tracking. The multiple healthcare devices 910 may correspond to many different patients and devices deployed throughout a healthcare facility, such as a hospital, clinic, or surgical center, for example. Accordingly, at any given time, a multitude of healthcare devices may be actively streaming a vast amount of raw data to the middleware component 908.

As raw data is received, the middleware component 908 normalizes the raw data and provides the raw data to the streaming platform 904. The streaming platform 904 may analyze the raw data to extract identifying information, such as metadata, a location within a facility, and/or a device identifier that are determined to be unique to a healthcare device or which are usable to distinguish a particular healthcare device from other healthcare devices. In one example, the streaming platform 904 determines that one particular raw data stream is being sent from a first healthcare device identified with a unique device identifier (e.g., vital sign monitor number 24). Using the unique device identifier, the streaming platform 904 communicates, via the middleware component 908, with the electronic health records 912 to identify whether the unique device identifier corresponds to one particular patient (e.g., John Doe), a facility room (e.g., operating room number four), for example. The middleware component 908 may retrieve information from a patient's electronic health record, a healthcare workflow for one or more patients, and/or from a particular medical order placed in a computerized physician order entry (CPOE) system, as stored and maintained in the electronic health records 912, and provide this information to the streaming platform 904. The middleware component 908 may retrieve information from one or more of the data repositories 914, end user applications 916 at remote computing devices, and an alarm system 918 as well.

The streaming platform 904 fuses information from a plurality of different externals sources to create connections between the information and external sources and add context to the raw data. By analyzing raw data alongside additional information obtained from other external sources (e.g., electronic health records 912), for example, the streaming platform 904 can identify whether there are correlations between raw data, additional information, and/or particular external sources, and can make inferences regarding the meaning and significance of the raw data in light of the additional information and/or other external sources. For example, the streaming platform may determine a heart rate monitor that is streaming raw data is currently associated with patient John Doe, based on an up-to-date electronic health record indicating that John Doe's patient identifier was scanned and linked to the medical identifier of the heart rate monitor. Then the streaming platform may determine that John Doe is also associated with a diagnosis of heart arrhythmia based on an electronic health record that is specific to John Doe. The streaming platform may fuse all of this information and store a record in cache that is specific to John Doe, such that subsequent raw data streaming from the heart rate monitor is automatically associated with and added to the information in the record in cache that is specific to John Doe. The record in cache may be maintained for a predetermined period of time and/or until the stream of raw data from the heart rate monitor is interrupted, for example. Additionally, the streaming platform 904 may disregard information that is determined to be unrelated to the raw data or is determined to be bad data.

Once the raw data has been transformed into enriched information by the streaming platform, the enriched information is provided to the integrated rule execution operator 920. The integrated rule execution operator 920 and sub-component thereof may generate fact sets and assign fact sets to a session. In the above-cited example, the enriched information produced from the raw data of the heart rate monitor may be partitioned into fact sets and assigned to one or more sessions that are specific to the device identifier of the heart rate monitor and/or the patient identifier of John Doe. Rules may be selected and executed against sessions. For example, one or more rules and/or rule sets may be selected and executed against the sessions specific to John Doe, based on any of the following: medical history of John Doe, John Doe's diagnosis of heart arrhythmia, age and demographic of John Doe, the make and model of the heart rate monitor, raw data previously received from the same heart rate monitor, rules that have been previously executed with regard to John Doe and/or other devices associated with John Doe, raw data that is currently being streamed from other devices associated with John Doe, and the like. The rules are obtained from a rule repository 922 and executed against a session in a batch-like manner in order to detect events.

Rules are customizable in the complex processing environments described herein. Users may create, modify, and delete rules as preferred. Rules may be personalized to an entity for which raw data is being streamed or an entity to which the raw data corresponds (e.g., rule drafted to specifically account for an individual characteristic). In some embodiments, basic rules may be modified and customized for a single patient. For example, a rule may be manually activated for a specific patient by a care team member through a clinical information system by placing a medical order. In one example, a rule may be automatically activated for any patient based on other rules that are pre-programmed to identify one or more other rules that should be activated for one or more of the patients. In another example, an event indicating that a specific medication has been administered to a patient may automatically activate one or more rules that monitor a patient's vital signs for possible respiratory distress.

Continuing, in one example, a basic rule governing the detection of heart arrhythmias may be modified and customized for John Doe. The basic rule may be customized by a clinician to change a threshold regarding when an irregularity of heart rate will be a detected event, as John Doe has a known condition of heart arrhythmia. In that example, the basic rule would detect events and could trigger actions such as issuing of a heart rate alarm over and over (i.e., "alarm fatigue"), which is not necessary for John Doe. As such, customizable rules can reduce or obviate alarm fatigue in clinical environments. Rules may be used to detect when a baseline changes and notify a user. For example, an event may be detected when the enriched information indicates that John Doe's baseline blood pressure has changed in view of previously recorded baseline blood pressure measurements for John Doe. An action may be instantiated to notify a clinician of the baseline change, as the baseline change could be an indication of medical complication and/or an early warning sign of a negative outcome.

Additionally, may be customized using specific parameters to define the application of the rule and when an event should be detected. For example, rules may be specific to situations and time frames. In one example, a first rule may be activated for patient Jane Doe that customizes the rule to have a threshold value of A. However, the same first rule may be activated for patient John Doe, but the first rule can be customized for John Doe by setting a different threshold value of B. Thus, rules can be customized for individuals, manually or atomically. For example, a basic rule may detect an event when SPO2 levels fall below a threshold and trigger an alert to an end user device. However, the basic rule may be customized to detect an event before the SPO2 level falls below a threshold when morphine has been administered to a patient, as documented in a workflow and/or an electronic health record (e.g., enriched information), for example. In such an example, the customized rule may detect an event based on SPO2 levels decreasing by a specified amount over a defined period of time, in view of the time and dosage of morphine administered, and trigger an alarm at a remote raw data capture device and/or communicate a notice or warning to a mobile device of a user. Rules may be driven by compliance or risk prevention. Rules may be goal oriented (e.g., event is detected when a goal is met or reached and action is instantiated to notify a user that the goal was met for reporting purposes or convenience). For example, a rule may detect an event when an SPO2 level recovers, or when a regular heart rate is maintained for a particular period of time, and an action may send a notice to an end user regarding the goal. In another example, a rule may be applied to patient A when a clinician administers a medication to patient A that is expected to lower patient A's blood pressured. The rule may be customized to monitor the patient's blood pressure for the clinician and to alert the clinician when the patient's blood pressure has been lowered, in such an example. In a further example, the rule might also issue an alert to the clinician if the blood pressure of the patient has not been decreased as predicted within a specified timeframe.

Rules may also be customized to govern their own application by the rule execution operator. For instance, a rule may be inactive or dormant, such that the rule is prevented from being executed until another event has been detected and/or enriched information includes new and relevant information. For example, a rule governing blood pressure events may be dormant until enriched information indicates that fluids have been administered. Based on the fluids information of the enriched information, the rule may become active and will be executed by the rule execution operator against enriched information. Accordingly, rules may become active or dormant based on the steady influx of enriched information through the streaming platform, event detections or lack thereof, and action instantiations. Generally, the rules are scalable, in that medians, trends in data, counts, and the like may be considered in event detection. When events are detected, notification of each event or combination of events is communicated to the streaming platform 904 and middleware component 908, in embodiments.

Figure 10:
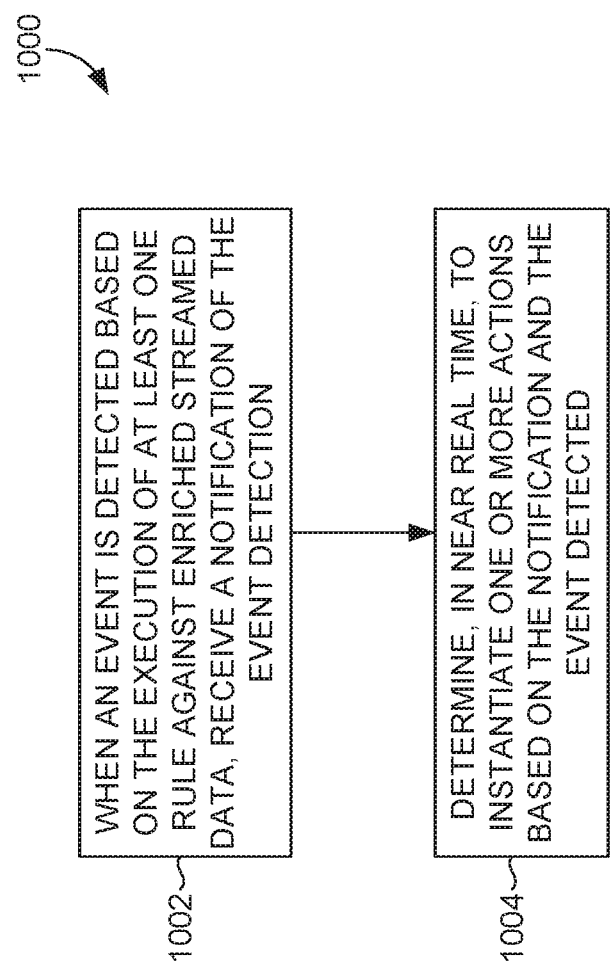
FIG. 10 depicts an exemplary method for event-detection action instantiation in a complex event processing system, in accordance with an embodiment of the present invention.

Once an event has been detected, actions may be implemented and performed in a number of distinct ways. FIG. 10 depicts a computer-implemented method 1000. In the computer-implemented method 1000, a notification is received when an event is detected, shown at block 1002. The event may be detected when the rule execution operator has executed one or more rules against enriched information. The computer-implemented method 1000 determines, in near real time, to instantiate one or more actions based on the notification and the event detected, shown at block 1004. Accordingly, actions are instantiated in near real time relative to the time that the raw data was received, from which an event was detected and which triggered the instantiated actions. In some embodiments, the computer-implemented method 1000 is performed via a monitoring application operating on a middleware component. In another embodiment, the computer-implemented method 1000 is performed by a streaming platform in combination with a middleware component. The computer-implemented method 1000 generally occurs in a complex processing environment which includes, for example, a streaming platform with an integrated rule execution operator, and which utilizes a middleware component.

When it is determined that one or more actions are to be instantiated in response to the event detection, the actions may be instantiated, for example, by the middleware component. The middleware component may communicate an instantiated action to an external source (e.g., electronic health records or raw data capture device) for performance and implementation. Alternatively, the middleware component may communicate a suggested action and/or instructions for an external source to instantiate an action. For example, the middleware component may communicate information regarding the event detected and a suggestion to perform an action that is responsive to the event to an external source. The external source, and/or an end user via a remote computing device, may ultimately determine whether to perform the suggested action or undertake another action instead. Any number of actions may be instantiated for a detected event and an instantiated action may be communicated to any number and type of external sources.

Additionally, or alternatively, a single action may be instantiated and communicated to multiple external sources, triggering each external source to initiate or perform various operations, tasks, or functions. For example, when an event is detected because John Doe's oxygen level is declining over a time period of 15 minutes, an action is instantiated which includes instructions that the oxygen level is too low or is approaching a threshold. The action may be communicated to a raw data capture device (e.g., a heart rate monitoring device), causing the raw data capture device to initiate the streaming of raw data to the streaming platform, and the action may also be communicated to an end user device, causing the end user device to issue an alert to a clinician, in such an example. In another embodiment, multiple actions are instantiated and communicated in combination to one external source, causing the external source to initiate or perform an operation, task, or function. For example, when multiple events are detected because John Doe's oxygen level is below a threshold and his heart rate is dropping (e.g., determined by rule execution against enriched information), an action is instantiated and communicated with instructions to an electronic health record system, causing the electronic health record system to record the oxygen level and heart rate information to a medical record specific to John Doe, and further, to issue a confirmation of successful recordation.

As used herein, an action generally refers to an actionable task (e.g., virtual or real world) that is created for the purpose of being performed in response to an event detection, or lack thereof in some instances. Exemplary actions include computer-readable instructions for a computing device to perform a function such as storing information, capturing information, initiate streaming raw data, cease streaming raw data, continue streaming raw data, retrieving information, communicating with one or more other devices, displaying a message using a graphical user interface on an end user device, communicating an alert to one or more targeted mobile devices, updating information, and the like. Other exemplary actions include computer-readable instructions for a computing device to prompt end users to perform a task, to input information, and/or to verify information, for instance. For example, an action may be communicated to an end user device or user application so that a user receives a directive to perform a patient care task. In another example, an action may include instructions to a raw data capture device that is not currently streaming data to initiate capturing and encoding raw data for communication to the streaming platform.

A rule that is executed to detect an event, the event being responsible for triggering an action, may influence action instantiation and action communication. When a rule is executed against the enriched streamed data to detect the event, the rule may be used to identify one or more of a middleware component, a remote user device, an application, a database storing electronic records specific to individuals, or a raw data capture device that corresponds to an action to be instantiated. Thus, a rule used to detect an event may specify a particular external source as a destination for an action that is or will be instantiated for that particular event, in some embodiments. Instructions for performance of an action may be directed to one or more of a middleware component, a remote user device, an application, a database storing electronic records specific to individuals, or a raw data capture device, for example.

In another embodiment, upon determining that one or more actions are to be instantiated, the one or more actions may be communicated to a raw data capture device and/or a raw data source. In some embodiments, an action includes a communication that is sent to a raw data capture device and that instructs the raw data capture device to stream physiologic patient data, as raw data, to the streaming platform. Accordingly, some actions may influence how raw data is streamed and what types of raw data are streamed into a complex processing environment. Further, just as some rules may govern or influence action instantiation as described above, actions that are or have been instantiated may influence or be considered by a rule execution operator. Instantiated actions and/or actions that are actively prevented from being instantiated may act as feedback to the rule execution operator, which may select and execute rules differently based on what actions have or are being instantiated. For example, if an action has been instantiated to initiate raw data streaming from a new device and raw data is received by the streaming platform, the rule execution operator may not execute a rule that would trigger a duplicate or redundant action (e.g., trigger the same or a similar device to initiate streaming of raw data). In another embodiment, an action may be delayed or 'held' by the middleware component unless or until another event detection occurs, at which point the action may fire. For example, an action for a clinician to intervene at a patient's bedside may not be instantiated until a certain threshold number of events (e.g., 10 blood pressure measurements with a diastole over 150) have been detected or until a particular combination of events are detected (e.g., heart rate steadily increasing above a baseline and heart arrhythmias detected).

Additionally or alternatively, when the middleware component receives a notification that an event is detected, the middleware component may perform other functions. For example, the middleware component may store a detected event, information about the event, and the time the event occurred in cache or memory and/or persistent memory. The event and event notification may be stored, for example, in an electronic record that is specific to an individual that corresponds to the enriched streamed data underlying the detected event. In another example, the middleware component may communicate the event and/or an indication of the event for storage in an electronic health record. The middleware component may add the event to a workflow, or populate a workflow with information and tasks that are responsive to the event, for example. In some embodiments, determining whether to instantiate one or more actions may also include making a determination to prevent instantiation of one or more actions. For example, when an event is detected because John Doe's heart rate is irregular, an action may be prevented from being instantiated because John Doe has a diagnosis of heart arrhythmias and the irregularity is appropriate in view of the diagnosis. Additionally, an action may be assigned a defined period of time based on the corresponding event detected. Thus, an action may lapse or expire if not initiated or performed by the expiration of the defined period of time.

The examples above are illustrative in nature and are not to be construed as limiting because implementations of the invention may be undertaken in different fields, including non-healthcare environments, and thus are considered to be within the scope of this invention.

The present invention has been described in relation to particular examples, which are intended in all respects to be illustrative rather than restrictive. From the foregoing, it will be seen that this invention is one well adapted to attain all the ends and objects set forth above, together with other advantages which are inherent to the system and method. It will be understood that certain features and subcombinations are of utility and may be employed without reference to other features and subcombinations. This is contemplated by and is within the scope of the claims.

What is claimed is:

1. One or more non-transitory computer-readable storage media having computer-executable instructions embodied thereon that, when executed by one or more processors, perform a method, the method comprising:

detecting, in near real-time, an event based on execution of a rule against an enriched data stream;

based on detecting the event, activating or de-activating a different rule, wherein when the different rule was previously dormant the different rule is activated for execution against the enriched data stream to detect an additional event, and wherein when the different rule was previously active the different rule is deactivated as blocked from execution against the enriched data stream;

based on the event that was detected, identifying a defined period of time;

based on a lapse of the defined period of time, determining whether to instantiate the event that is detected;

when it is determined to instantiate the event, instantiating the event; and communicating a notification of the event in response to instantiating the event that is detected.

2. The method of claim 1 wherein the notification prompts a user to perform an action, wherein the action is a specific patient care task that is responsive to the event.

3. The method of claim 1 wherein the notification instructs a device to perform an action, wherein the action is streaming physiologic patient data to a streaming platform having an integrated rule execution operator.

4. The method of claim 1, further comprising:

storing an indication of the event that is detected in an entity-specific record stored in cache memory; and purging the cache memory of the entity-specific record based on the lapse of a session.

5. The method of claim 1 wherein the notification of the event instructs a mobile device to perform an action, wherein the action is issuing an alert of the event that was instantiated.

6. The method of claim 1 wherein, based on the lapse of the defined period of time, determining to instantiate the event that was detected.

7. The method of claim 1 wherein, based on the lapse of the defined period of time, determining not to instantiate the event that was detected.

8. The method of claim 1 wherein, based on instantiating the event that was detected, instantiating one or more actions.

9. A computerized method comprising:

detecting, in near real-time, a plurality of events based on execution of a rule against an enriched data stream;

based on detecting at least one of the plurality of events, activating or de-activating a different rule, wherein when the different rule was previously dormant the different rule is activated for execution against the enriched data stream, and wherein when the different rule was previously active the different rule is deactivated as blocked from execution against the enriched data stream;

based on the plurality of events that are detected, identifying a defined period of time;

based on a lapse of the defined period of time, determining whether to instantiate the plurality of events that are detected;

when it is determined to instantiate the plurality of events that are detected, instantiating the plurality of events; and communicating a notification of the plurality of events in response to instantiating the plurality of events.

10. The method of claim 9 wherein the defined period of time is specific to a particular combination of events in the plurality of events that are detected.

11. The method of claim 9 wherein the defined period of time is based on one or more of a rule type or a quantity of the plurality of events.

12. The method of claim 9 wherein it is determined to instantiate the plurality of events when at least one additional event is detected in near real-time in the enriched data stream prior to the lapse of the defined period of time.

13. The method of claim 9 wherein it is determined not to instantiate the plurality of events when at least one additional event is detected in near real-time in the enriched data stream prior to the lapse of the defined period of time.

14. The method of claim 9 wherein it determined to instantiate the plurality of events when one or more data items are received prior to the lapse of the defined period of time.

15. The method of claim 9 wherein it determined to not instantiate the plurality of events when one or more data items are not received prior to the lapse of the defined period of time.

16. The method of claim 9 further comprising instantiating an action in response to instantiating the action.

17. The method of claim 9 further comprising instantiating one or more actions in response to instantiating the plurality of events.

18. A system comprising:
a streaming platform that comprises a rule execution operator, the streaming platform having one or more processors configured to:
detect, in near real-time, a plurality of events based on execution of a first rule against an enriched data stream;
based on detecting at least one of the plurality of events, activating or de-activating a different rule, wherein when the different rule was previously dormant the different rule is activated for execution against the enriched data stream to detect an additional event, and wherein when the different rule was previously active the different rule is deactivated as blocked from execution against the enriched data stream;
based on the plurality of events that are detected, identify a defined period of time for the plurality of events;
based on a lapse of the defined period of time, determine whether to instantiate the plurality of events that are detected;
when it is determined to instantiate the plurality of events, instantiate the plurality of events; and
communicate a notification of instantiation of the plurality of events in response to instantiating the plurality of events that are detected.

* * * * *